(12) United States Patent
Park et al.

(10) Patent No.: US 10,791,508 B2
(45) Date of Patent: Sep. 29, 2020

(54) METHOD FOR SELECTING NETWORK NODE IN WIRELESS COMMUNICATION SYSTEM AND DEVICE THEREFOR

(71) Applicant: LG Electronics Inc., Seoul (KR)

(72) Inventors: Sangmin Park, Seoul (KR); Jinsook Ryu, Seoul (KR); Hyunsook Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/461,660

(22) PCT Filed: Nov. 16, 2017

(86) PCT No.: PCT/KR2017/013019
§ 371 (c)(1),
(2) Date: May 16, 2019

(87) PCT Pub. No.: WO2018/093168
PCT Pub. Date: May 24, 2018

(65) Prior Publication Data
US 2019/0357129 A1    Nov. 21, 2019

Related U.S. Application Data

(60) Provisional application No. 62/455,620, filed on Feb. 7, 2017, provisional application No. 62/424,358, filed on Nov. 18, 2016.

(51) Int. Cl.
*H04W 4/00* (2018.01)
*H04W 48/18* (2009.01)
*H04W 60/00* (2009.01)

(52) U.S. Cl.
CPC ........... *H04W 48/18* (2013.01); *H04W 60/00* (2013.01)

(58) Field of Classification Search
USPC ......................................................... 455/434
See application file for complete search history.

(56) References Cited

U.S. PATENT DOCUMENTS

2016/0219503 A1  7/2016 Kim et al.
2017/0142591 A1* 5/2017 Vrzic .................... H04W 24/08
(Continued)

FOREIGN PATENT DOCUMENTS

WO   WO2016159522   10/2016
WO   WO2016162480   10/2016

OTHER PUBLICATIONS

Motorola Mobility, "Interim agreement: Determination of NSSAI based on UE policy," S2-166603, SA WG2 Meeting #118, Reno, Nevada, Nov. 14-28, 2016, 5 pages.
(Continued)

*Primary Examiner* — David Q Nguyen
(74) *Attorney, Agent, or Firm* — Fish & Richardson P.C.

(57) ABSTRACT

A method for selecting a serving AMF of a network node in a wireless communication system includes receiving a registration request message of a user equipment (UE), the registration request message including a network slice selection assistance information (NSSAI) for a slice requested by the UE and priority information of the NSSAI; determining whether the NSSAI is valid for the UE; when the NSSAI is valid for the UE, searching a first AMF which is able to support the NSSAI based on the priority information; and when the first AMF is searched, selecting the first AMF as the serving AMF serving the UE and transmitting the registration request message to the first AMF.

12 Claims, 14 Drawing Sheets

(56) References Cited

U.S. PATENT DOCUMENTS

2019/0364541 A1* 11/2019 Ryu ..................... H04W 76/25
2019/0364605 A1* 11/2019 Loehr ............... H04W 74/0833
2020/0059989 A1* 2/2020 Velev ................... H04W 76/32

OTHER PUBLICATIONS

"3GPP; TSGSA; E-UTRA; Study on Architecture for Next Generation System (Release 14)," 3GPP TR 23.799 V1.1.0, dated Oct. 31, 2016, 503 pages.
Extended European Search Report in European Application No. 17871555.3, dated Mar. 23, 2020, 9 pages.
LG Electronics, "Interim agreements on the network slice re-selection," S2-166474, SA WG2 Meeting #118, Reno, Nevada, USA, Nov. 14-18, 2016, 7 pages.
Qualcomm Incorporated, "Way forward on Solutions for Key Issue 1 on Network Slicing," S2-165762, SA WG2 Meeting #116bis, Kaohsiung, Taiwan, dated Oct. 17-21, 2016, 8 pages.

* cited by examiner (a) Control plane protocol stack (b) User plane protocol stack (a)

(b)

METHOD FOR SELECTING NETWORK NODE IN WIRELESS COMMUNICATION SYSTEM AND DEVICE THEREFOR

CROSS-REFERENCE TO RELATED APPLICATIONS

This application is a National Stage application under 35 U.S.C. § 371 of International Application No. PCT/KR2017/013019, filed on Nov. 16, 2017, which claims the benefit of U.S. Provisional Application No. 62/455,620, filed on Feb. 7, 2017, and U.S. Provisional Application No. 62/424,358, filed on Nov. 18, 2016. The disclosures of the prior applications are incorporated by reference in their entirety.

TECHNICAL FIELD

The present invention relates to a wireless communication system, and more particularly to a method for efficiently selecting a network node capable of supporting slice/service requested by a user equipment (UE) and a device performing the same.

BACKGROUND ART

A mobile communication system has been developed to provide a voice service while guaranteeing activity of a user. However, the mobile communication system extends an area up to a data service as well as a voice and at present, a short phenomenon of a resource is caused due to an explosive increase of traffic and uses require a higher-speed service, and as a result, a more developed mobile communication system is required.

Requirements of a next-generation mobile communication system largely need to support accommodation of explosive data traffic, an epochal increase of transmission rate per user, accommodation of the significantly increased number of connection devices, very low end-to-end latency, and high energy efficiency. To this end, various technologies have been researched, which include dual connectivity, massive multiple input multiple output (MIMO), in-band full duplex, non-orthogonal multiple access (NOMA), super wideband supporting, device networking, and the like.

DISCLOSURE

Technical Problem

An object of the present invention is to propose a solution to efficiently select a network supporting slice/service demanded/requested by a user equipment (UE) or a network providing better services to the UE, when using network slicing in a next generation core network.

Another object of the present invention is to properly support a required operation/function of a UE by selecting/configuring a network node preferentially considering slice/service necessarily requested by a UE.

Technical problems to be solved by the present invention are not limited by the above-mentioned technical problems, and other technical problems which are not mentioned above can be clearly understood from the following description by those skilled in the art to which the present invention pertains.

Technical Solution

In one aspect of the present invention, there is provided a method for selecting a serving Access and Mobility Management Function (AMF) of a network node in a wireless communication system, the method comprising receiving a registration request message of a user equipment (UE), the registration request message including a network slice selection assistance information (NSSAI) for a slice requested by the UE and a priority information of the NSSAI; determining whether the NSSAI is valid for the UE; when the NSSAI is valid for the UE, searching a first AMF which is able to support the NSSAI based on the priority information; and when the first AMF is searched, selecting the first AMF as the serving AMF serving the UE and transmitting the registration request message to the first AMF.

The priority information may indicate whether the NSSAI or at least one S(single)-NSSAI included in the NSSAI is 'required' for the UE and/or whether the NSSAI or the at least one S-NSSAI is 'preferred' by the UE.

The first AMF which is able to support the NSSAI may be an AMF that supports all slices corresponding to the NSSAI or the S-NSSAI indicating that the priority information is the 'required'.

The method may further comprise, when the first AMF is not searched or the NSSAI is not valid for the UE, transmitting to the UE a registration reject message as a response to the registration request message.

The determining whether the slice is valid for the UE may comprise determining whether the slice is valid for the UE based on a subscription of the UE.

The registration reject message may include a registration reject cause.

When the registration reject cause indicates that the first AMF is not searched, the UE may perform a public land mobile network (PLMN) reselection operation.

When the registration reject cause indicates that the NSSAI is not valid for the UE, the UE may update the priority information of the NSSAI or the S-NSSAI in the registration reject message to the 'preferred' and retransmit the registration request message to the network node.

The method may further comprise, when the first AMF is not searched, selecting a second AMF, that supports S-NSSAI included in the NSSAI at most, as the serving AMF and transmitting the registration request message to the second AMF.

The method may further comprise receiving, from the UE, an additional NSSAI and a priority information of the additional NSSAI via a protocol data unit (PDU) session establishment request message.

The method may further comprise, when a priority of the additional NSSAI is higher than a priority of the NSSAI received via the registration request message, determining whether the first AMF is able to support the additional NSSAI.

The method may further comprise, when the first AMF is unable to support the additional NSSAI, transmitting to the UE a reject message for the PDU session establishment request message.

The network node may be an AMF identified by an AMF ID received through a previous registration procedure or a predetermined default AMF.

In another aspect of the present invention, there is provided a network node for selecting a serving Access and Mobility Management Function (AMF) in a wireless communication system, the network node comprising a communication module configured to transmit and receive a signal; and a processor configured to control the communication module, wherein the processor is configured to receive a registration request message of a user equipment (UE), the registration request message including a network slice selection assistance information (NSSAI) for a slice requested by the UE and a priority information of the NSSAI; determine whether the NSSAI is valid for the UE; when the NSSAI is valid for the UE, search a first AMF which is able to support the NSSAI based on the priority information; and when the first AMF is searched, select the first AMF as the serving AMF serving the UE and transmit the registration request message to the first AMF.

The priority information may indicate whether the NSSAI or at least one S(single)-NSSAI included in the NSSAI is 'required' for the UE and/or whether the NSSAI or the at least one S-NSSAI is 'preferred' by the UE.

Advantageous Effects

Embodiments of the present invention have an effect that criteria for selecting an AMF become clear.

Embodiments of the present invention have an effect capable of configuring properly/efficiently a network node to further meet needs of a UE and a user since the network node preferentially selects an AMF that is further required for the UE based on priority information of NSSAI Effects obtainable from the present invention are not limited by the effects mentioned above, and other effects which are not mentioned above can be clearly understood from the following description by those skilled in the art to which the present invention pertains.

DESCRIPTION OF DRAWINGS

The accompanying drawings, which are included to provide a further understanding of the invention as a part of detailed descriptions, illustrate embodiments of the invention and together with the descriptions, serve to explain the technical principles of the invention.

MODE FOR INVENTION

Figure 1:
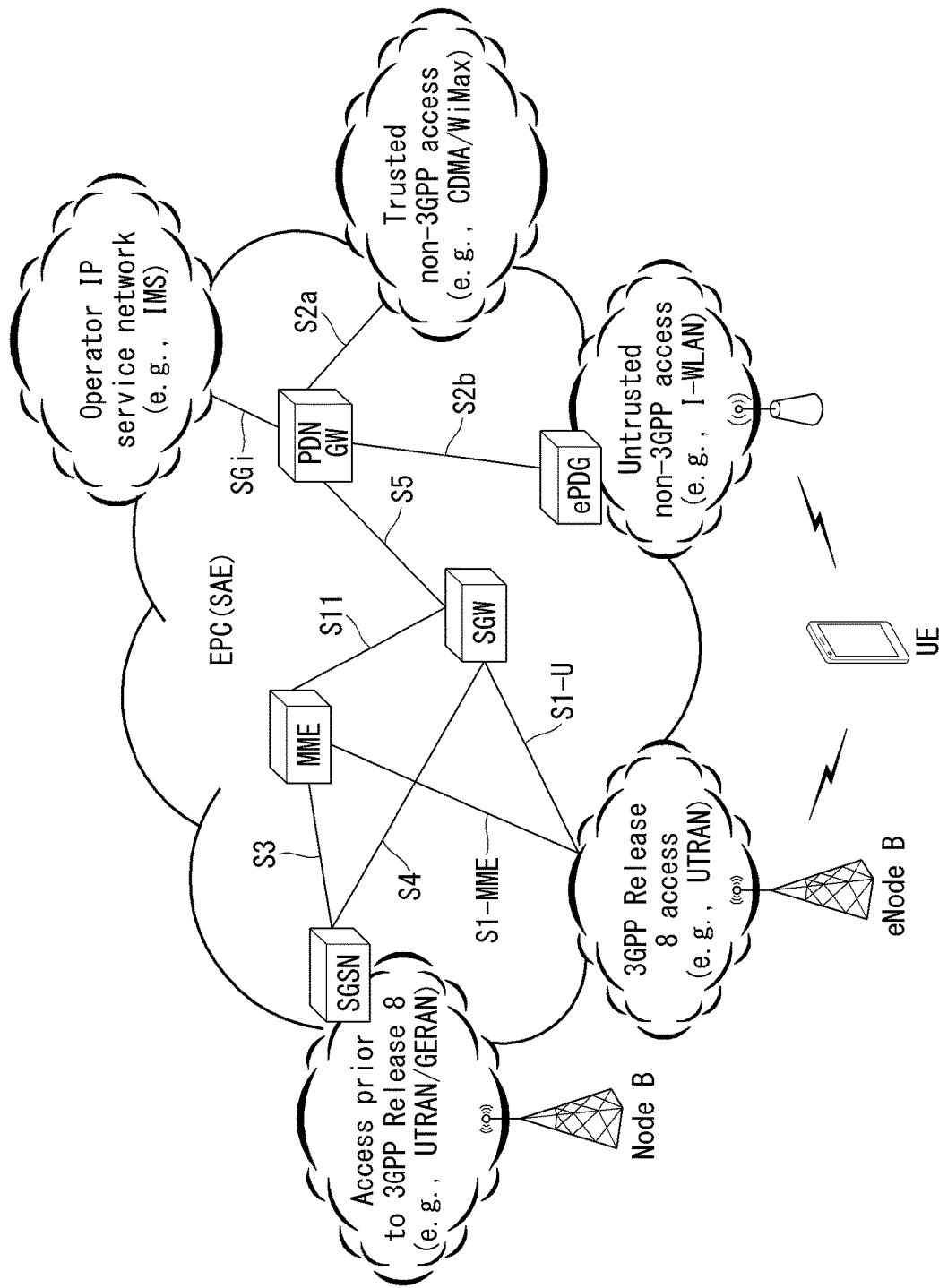
FIG. 1 illustrates an Evolved Packet System (EPS) to which the present invention is applicable.

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device or MRT apparatus): a terminal (e.g., a vending machine, meter, and so on) equipped with a communication function (e.g., communication with an MTC server through PLMN) operating through a mobile communication network and performing the MTC functions.

MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC user: an MTC user uses a service provided by an MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for a use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): an entity in 3GPP architecture for the service capability exposure that provides a means for safely exposing a service and a capability provided by 3GPP network interface.

In what follows, the present invention will be described based on the terms defined above.

Overview of System to which the Present Invention is Applicable

FIG. 1 illustrates an Evolved Packet System (EPS) to which the present invention is applicable.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and Wimax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |

TABLE 1-continued

| Reference Point | Description |
|---|---|
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

Figure 2:
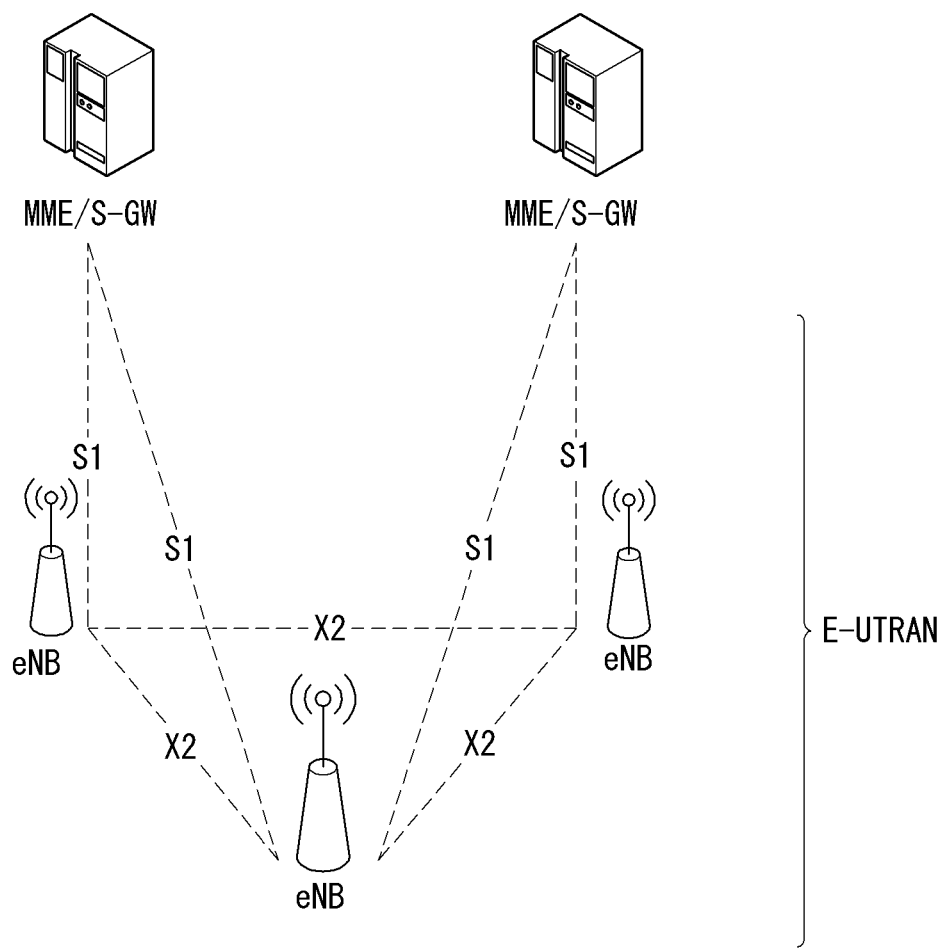
FIG. 2 illustrates one example of an Evolved Universal Terrestrial Radio Access Network (E-UTRAN) to which the present invention is applicable.

FIG. 2 illustrates one example of an Evolved Universal Terrestrial Radio Access Network (E-UTRAN) to which the present invention is applicable.

The E-UTRAN system has evolved from an existing UTRAN system and may be the 3GPP LTE/LTE-A system, for example. A communication system is disposed over a wide area to provide various communication services including voice communication through IMS and packet data (for example, VoIP (Voice over Internet Protocol)).

Referring to FIG. 2, an E-UMTS network comprises an E-UTRAN, EPC, and one or more UEs. The E-UTRAN comprises eNBs providing a UE with a control plane and user plane protocols, where the eNBs are connected to each other through X2 interface.

The X2 user plane interface (X2-U) is defined among the eNBs. The X2-U interface provides non-guaranteed delivery of the user plane Protocol Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, NAS signaling transport, network sharing, MME load balancing management, and so on. The S1 interface supports many-to-many-relation between the eNB and the MME/S-GW.

An MME is capable of performing various functions such as NAS signaling security, AS (Access Stratum) security control, inter-CN (Core Network) signaling for supporting mobility among 3GPP access networks, IDLE mode UE reachability (including performing and controlling retransmission of a paging message), TAI (Tracking Area Identity) management (for IDLE and active mode UEs), PDN GW and SGW selection, MME selection for handover in which MMES are changed, SGSN selection for handover to a 2G or 3G 3GPP access network, roaming, authentication, bearer management function including dedicated bearer establishment, and support for transmission of a PWS (Public Warning System) (including Earthquake and Tsunami Warning System (ETWS) and Commercial Mobile Alert System (CMAS)) message.

Figure 3:
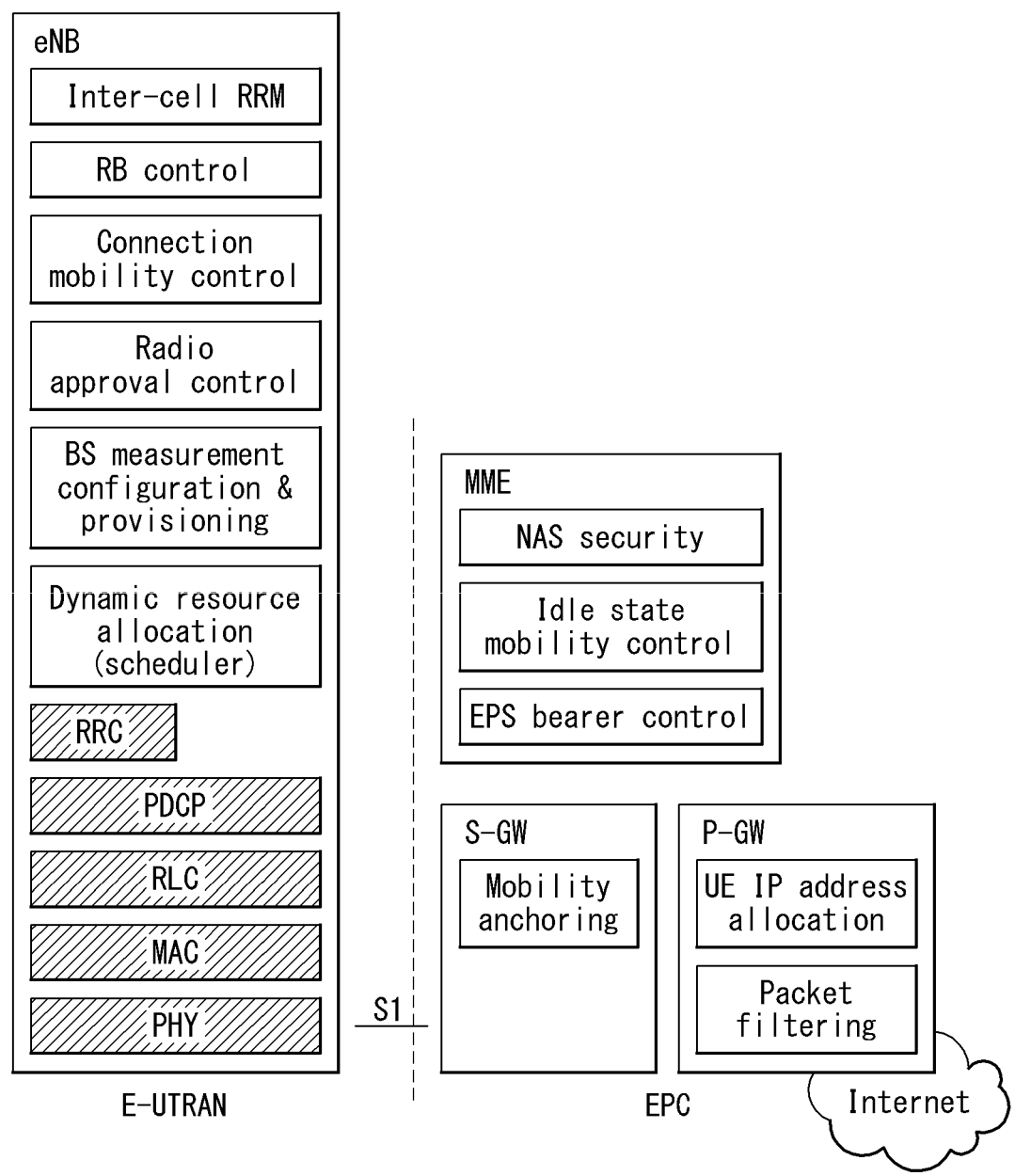
FIG. 3 illustrates structures of an E-UTRAN and an EPC in a wireless communication system to which the present invention is applicable.

FIG. 3 illustrates structures of an E-UTRAN and an EPC in a wireless communication system to which the present invention is applicable.

Referring to FIG. 3, an eNB is capable of performing functions such as selection of a gateway (for example, MME), routing to a gateway during RRC (Radio Resource Control) activation, scheduling and transmission of a BCH (Broadcast Channel), dynamic resource allocation for a UE in uplink and downlink transmission, and mobility control connection in an LTE_ACTIVE state. As described above, a gateway belonging to an EPC is capable of performing functions such as paging origination, LTE_IDLE state management, ciphering of a user plane, SAE (System Architecture Evolution) bearer control, and ciphering of NAS signaling and integrity protection.

Figure 4:
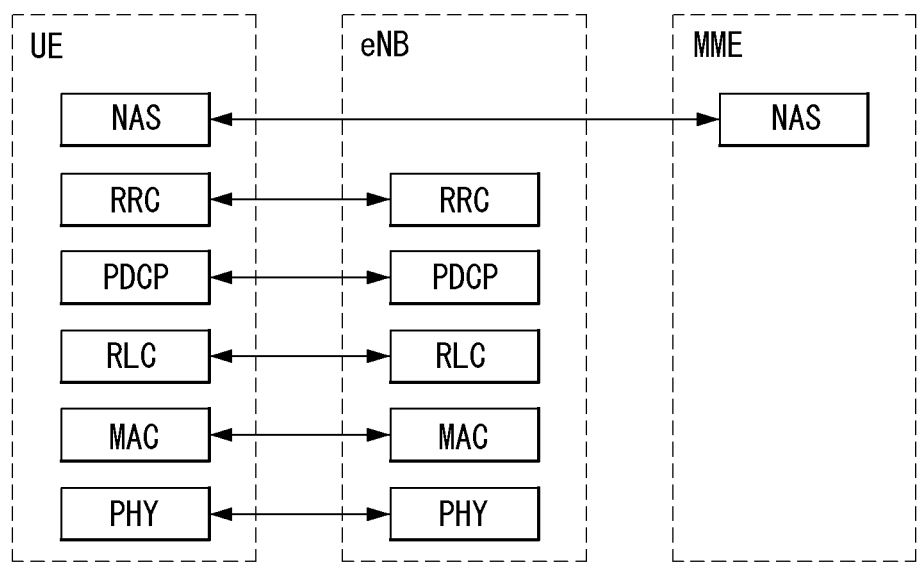
FIG. 4 illustrates a radio interface protocol structure between a UE and an E-UTRAN in a wireless communication system to which the present invention is applicable.
Figure 4:
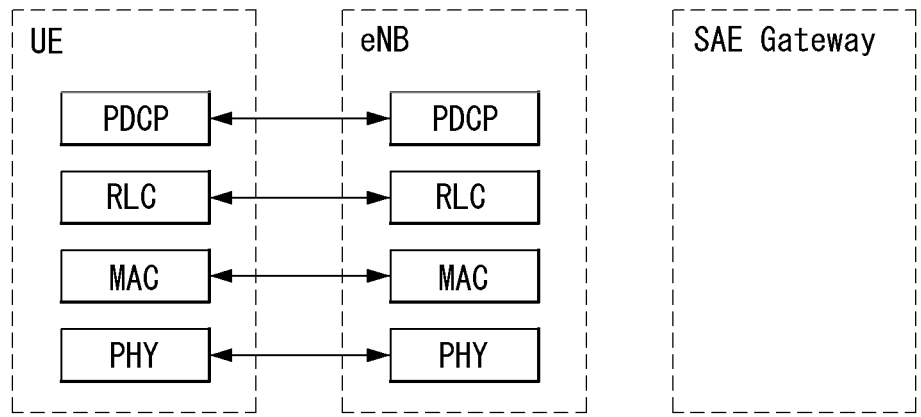

FIG. 4 illustrates a radio interface protocol structure between a UE and an E-UTRAN in a wireless communication system to which the present invention is applicable.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and includes unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

A logical channel lies above a transmission channel and is mapped to the transmission channel. The logical channel may be divided into a control channel for delivering control area information and a traffic channel for delivering user area information. The control channel may include a BCCH (Broadcast Control Channel), PCCH (Paging Control Channel), CCCH (Common Control Channel), DCCH (Dedicated Control Channel), and MCCH (Multicast Control Channel). The traffic channel may include a DTCH (Dedicated Traffic Channel) and MTCH (Multicast Traffic Channel). The PCCH is a downlink channel for delivering paging information and is used when a network does not know the cell to which a UE belongs. The CCCH is used by a UE that does not have an RRC connection to a network. The MCCH is a point-to-multipoint downlink channel used for delivering MBMS (Multimedia Broadcast and Multicast Service) control information from a network to a UE. The DCCH is a point-to-point bi-directional channel used by a UE with an RRC connection delivering dedicated control information between a UE and a network. The DTCH is a point-to-point channel dedicated to one UE for delivering user information that may exist in an uplink and downlink. The MTCH is a point-to-multipoint downlink channel for delivering traffic data from a network to a UE.

In the case of an uplink connection between a logical channel and a transport channel, the DCCH may be mapped to a UL-SCH, and the DTCH may be mapped to a UL-SCH, and the CCCH may be mapped to a UL-SCH. In the case of a downlink connection between a logical channel and a transport channel, the BCCH may be mapped to a BCH or DL-SCH, the PCCH may be mapped to a PCH, the DCCH may be mapped to a DL-SCH, the DTCH may be mapped to a DL-SCH, the MCCH may be mapped to an MCH, and the MTCH may be mapped to the MCH.

Figure 5:
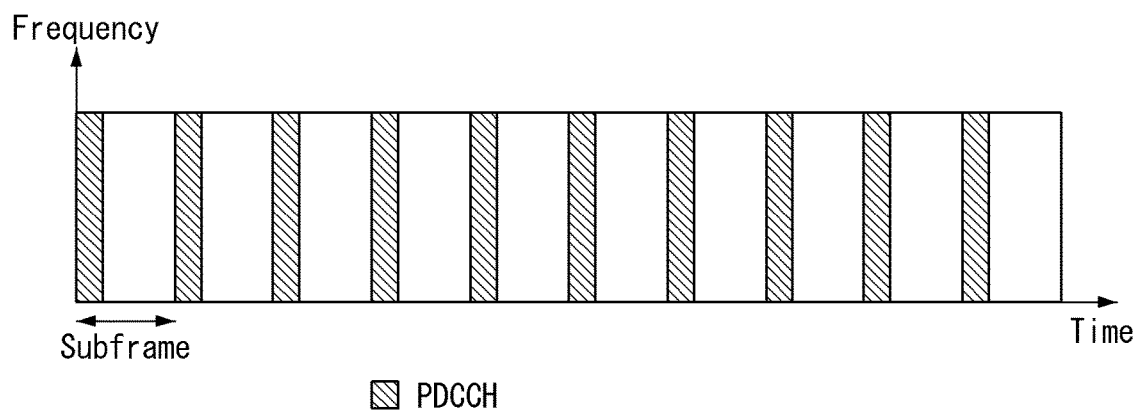
FIG. 5 is a diagram illustrating in brief the structure of a physical channel in a wireless communication system to which the present invention is applicable.

FIG. 5 is a diagram illustrating in brief the structure of a physical channel in a wireless communication system to which the present invention is applicable.

Referring to FIG. 5, a physical channel transfers signaling and data through radio resources including one or more subcarriers in a frequency domain and one or more symbols in a time domain.

One subframe having a length of 1.0 ms includes a plurality of symbols. A specific symbol(s) of the subframe (e.g., the first symbol of the subframe) may be used for a PDCCH. The PDCCH carries information (e.g., a resource block and modulation and coding scheme (MCS) and so on) about dynamically allocated resources.

New Generation Radio Access Network (NG-RAN) (or RAN) System

Terms used in a new generation radio access network may be defined as follows.

Evolved packet system (EPS): a network system including an evolved packet core (EPC), that is, an Internet protocol (IP)-based packet switched core network, and an access to network such as LTE or UTRAN. A network is an evolved network form of universal mobile telecommunications system (UMTS).

eNodeB: an eNB of an EPS network. It is disposed outdoors and has coverage of a macro cell volume.

International Mobile Subscriber Identity (IMSI): a user identity internationally uniquely allocated in a mobile communication network.

Public Land Mobile Network (PLMN): a network configured to provide persons with a mobile communication service. It may be differently configured for each operator.

5G system (5GS): a system including a 5G access network (AN), a 5G core network and a user equipment (UE).

5G access network (5G-AN) (or AN): an access network including a new generation radio access network (NG-RAN) and/or a non-3GPP access network (non-3GPP AN) connected to a 5G core network.

New generation radio access network (NG-RAN) (or RAN): a radio access network having a common characteristic in that it is connected to 5GC and supporting one or more of the following options:
1) Standalone new radio.
2) New radio, that is, an anchor supporting an E-UTRA extension.
3) Standalone E-UTRA (e.g., eNodeB).
4) Anchor supporting a new radio extension 5G core network (5GC): a core network connected to a 5G access network Network function (NF): it means a processing function adopted in 3GPP within a network or defined in 3GPP. The processing function includes a defined functional behavior and an interface defined in 3GPP.

NF service: it is a (consumed) function exposed by an NF through a service-based interface and used by another authenticated NF(s).

Network slice: a logical network providing a specific network capability(s) and network characteristic(s).

Network slice instance: a set of NF instance(s) forming a network slice and required resource(s) (e.g., calculation, storage and networking resources)

Protocol data unit (PDU) connectivity service: a service providing the exchange of PDU(s) between a UE and a data network.

PDU session: an association providing PDU connectivity service between a UE and a data network. An association type may be an Internet protocol (IP) or Ethernet or may be unstructured.

Non-access stratum (NAS): a functional layer for exchanging signaling or traffic messages between a UE and a core network in an EPS, 5GS protocol stack. It has a main function of supporting the mobility of a UE and supporting a session management procedure.

Random Access Procedure

A random access procedure provided by the LTE/LTE-A system is described below.

The random access procedure is used for a UE to obtain uplink synchronization with an eNB or to have uplink radio resources allocated thereto. When the UE is powered on, the UE obtains downlink synchronization with an initial cell and receives system information. The UE obtains, from the system information, information about a set of available random access preambles and radio resources used to transmit a random access preamble. The radio resources used to transmit the random access preamble may be specified as a combination of at least one subframe index and an index on a frequency domain. The UE transmits a random access preamble randomly selected from a set of random access preambles, and the eNB receiving the random access preamble sends a timing alignment (TA) value for the uplink synchronization to the UE through a random access response. Hence, the UE obtains the uplink synchronization.

The random access procedure is a procedure common to frequency division duplex (FDD) and time division duplex (TDD). The random access procedure is irrelevant to a cell size and is also irrelevant to the number of serving cells if carrier aggregation (CA) is configured.

First, the UE performs the random access procedure in the following cases.

If the UE performs initial access in a RRC idle state because it does not have RRC connection with the eNB If the UE performs an RRC connection re-establishment procedure If the UE first accesses a target cell in a handover process If the random access procedure is requested by a command from the eNB If data to be transmitted in downlink occurs in an uplink non-synchronized situation in a RRC connection state If data to be transmitted in uplink occurs in an uplink non-synchronized situation or in a situation, in which designated radio resources used to request radio resources are not allocated, in the RRC connection state If the positioning of the UE is performed in a situation, in which timing advance is necessary, in the RRC connection state If a recovery process is performed upon radio link failure or handover failure In 3GPP Rel-10, a method for commonly applying a timing advance (TA) value applicable to one specific cell (e.g., P cell) to a plurality of cells in a radio access system supporting carrier aggregation has been taken into consideration. The UE may aggregate a plurality of cells belonging to different frequency bands (i.e., greatly spaced apart on frequency) or a plurality of cells having different propagation characteristics. Further, in case of a specific cell, in order to expand a coverage or remove a coverage hole, if the UE performs communication with an eNB (i.e., macro eNB) through one cell and performs communication with a secondary eNB (SeNB) through other cell in a situation in which a remote radio header (RRH) (i.e., repeater), a small cell such as a femto cell or a pico cell, or the SeNB is disposed in the cell, the plurality of cells may have different propagation delay characteristics. In this case, if the UE performs uplink transmission using the method for commonly applying one TA value to the plurality of cells, the uplink transmission may severely affect the synchronization of an uplink signal transmitted on the plurality of cells. Thus, a plurality of TAs may be used in a CA situation in which the plurality of cells is aggregated. In 3GPP Rel-11, in order to support multiple TAs, the independent allocation of the TA may be considered for each specific cell group. This is called a TA group (TAG). The TAG may include one or more cells, and the same TA may be commonly applied to one or more cells included in a TAG. In order to support the multiple TAs, an MAC TA command control element consists of 2-bit TAG identification (ID) and 6-bit TA command field.

The UE in which carrier aggregation is configured performs a random access procedure if the UE performs the random access procedure described above in relation to the P cell. In case of a TAG (i.e., a primary TAG (pTAG)) to which the P cell belongs, as in an existing technology, TA determined based on the P cell or adjusted through a random access procedure involved in the P cell may be applied to all of cell(s) within the pTAG. On the other hand, in case of a TAG (i.e., secondary TAG (sTAG)) including only an S cell, TA determined based on a specific S cell within the sTAG may be applied to all of cell(s) within the corresponding sTAG. In this instance, the TA may be obtained by a random access procedure initiated by the eNB. More specifically, the S cell is configured as a random access channel (RACH) resource within the sTAG, and the eNB requests RACH access in the S cell in order to determine the TA. That is, the eNB initiates RACH transmission on S cells in response to a PDCCH order transmitted in the P cell. A response message for an S cell preamble is transmitted via a P cell using a random access radio network temporary identifier (RA-RNTI). The UE may apply TA, determined based on an S cell which has successfully completed random access, to all of cell(s) in a corresponding sTAG. As described above, the random access procedure may be performed even on the S cell in order to obtain the timing alignment of the sTAG to which the corresponding S cell belongs.

The LTE/LTE-A system provides both a contention based random access procedure, in which the UE randomly selects one preamble in a specific set and uses it, and a non-contention based random access procedure, which uses a random access preamble the eNB allocates to only a specific UE, in a process of selecting a random access preamble (RACH preamble). However, the non-contention based random access procedure may be used for only the above-described handover process, the case where it is requested by a command from the eNB, the UE positioning, and/or timing advance alignment for the sTAG. After the random access procedure is completed, common uplink/downlink transmission is generated.

A relay node (RN) also supports both the contention based random access procedure and the non-contention based random access procedure. When the relay node performs the random access procedure, it suspends RN subframe configuration at that point of time. That is, it means temporarily discarding the RN subframe configuration. Thereafter, the RN subframe configuration is resumed at time at which the random access procedure is successfully completed.

Figure 6:
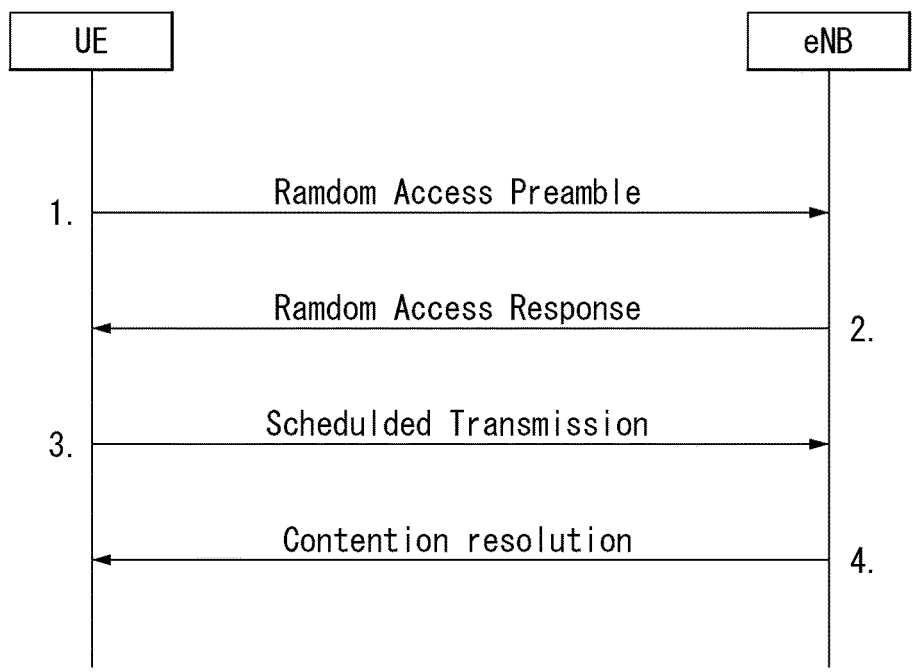
FIG. 6 illustrates a contention based random access procedure in a wireless communication system to which the present invention is applicable.

FIG. 6 illustrates a contention based random access procedure in a wireless communication system to which the present invention is applicable.

(1) First message (Msg 1, message 1)

First, a UE randomly selects one random access preamble (RACH preamble) from a set of random access preambles indicated by system information or a handover command, selects a physical RACH (PRACH) resource capable of transmitting the random access preamble, and transmits the selected physical RACH (PRACH).

The random access preamble is transmitted at 6 bits in a RACH transport channel. The 6 bits consists of 5-bit random identity for identifying the UE that performs RACH transmission and 1 bit (e.g., indicating the size of a third message Msg3) for representing additional information.

An eNB receiving the random access preamble from the UE decodes the random access preamble and obtains an RA-RNTI. The RA-RNTI related to the PRACH to which the random access preamble is transmitted is determined by time-frequency resource of the random access preamble transmitted by the corresponding UE.

(2) Second Message (Msg 2, Message 2)

The eNB sends, to the UE, a random access response addressed by the RA-RNTI obtained via the preamble on the first message. The random access response may include a random access (RA) preamble index/identifier, uplink (UL) grant informing of uplink radio resources, a temporary cell-RNTI (TC-RNTI), and a time alignment command (TAC). The TAC is information indicating a time alignment command that the eNB sends to the UE in order to maintain uplink time alignment. The UE updates uplink transmission timing using the TAC. When the UE updates time alignment, the UE initiates or restarts a time alignment timer. The UL grant includes an uplink resource allocation and a transmit power command (TPC) that are used to transmit a scheduling message (third message) to be described later. The TPC is used to determine transmission power for a scheduled PUSCH.

After the UE transmits the random access preamble, the UE attempts to receive its own random access response in a random access response window the eNB indicates via system information or a handover command, detects a PDCCH masked with an RA-RNTI corresponding to PRACH, and receives a PDSCH indicated by the detected PDCCH. Information about the random access response may be transmitted in the format of a MAC packet data unit (PDU), and the MAC PDU may be transferred via the PDSCH. The PDCCH may include information about the UE that has to receive the PDSCH, information about frequency and time of radio resources of the PDSCH, and a transmission format of the PDSCH. As described above, once the UE succeeds in detecting the PDCCH transmitted to itself, the UE can properly receive the random access response transmitted to the PDSCH according to information of the PDCCH.

The random access response window means a maximum time interval for which the UE transmitting the preamble waits to receive a random access response message. The random access response window has a length of 'ra-ResponseWindowSize' that starts from a subframe following three subframes from a last subframe in which the preamble is transmitted. That is, the UE waits to receive the random access response during a random access window secured following three subframes from a subframe in which preamble transmission is ended. The UE may obtain a parameter value of a random access window size 'ra-ResponseWindowsize' via the system information, and the random access window size may be determined to be a value between 2 and 10.

If the UE successfully receives a random access response having the same random access preamble index/identifier as the random access preamble that has been transmitted to the eNB, the UE suspends the monitoring of the random access response. On the other hand, if the UE does not receive a random access response message until the random access response window is terminated, or the UE does not receive a valid random access response having the same random access preamble index as the random access preamble that has been transmitted to the eNB, the UE considers the reception of the random access response as a failure and then may perform preamble retransmission.

As described above, a reason why the random access preamble index is necessary for the random access response is to inform which UE is valid for the UL grant, the TC-RNTI, and the TAC because random access response information for one or more UEs may be included in one random access response.

(3) Third Message (Msg 3, Message 3)

If the UE receives a valid random access response for itself, the UE individually processes each of information included in the random access response. That is, the UE applies a TAC and stores a TC-RNTI. Further, the UE transmits data stored in a buffer of the UE or newly generated data to the eNB using the UL grant. In case of a first connection of the UE, an RRC connection request generated in the RRC layer and transferred via a CCCH may be included in the third message and transmitted. In the case of an RRC connection re-establishment procedure, an RRC connection re-establishment request generated in the RRC layer and transferred via a CCCH may be included in the third message and transmitted. Furthermore, the third message may include an NAS access request message.

The third message should include an identifier of the UE. The reason is that the UEs have to be identified for a contention resolution afterwards because the eNB cannot determine which UEs perform the random access procedure in the contention based random access procedure.

There are two methods for including the identifier of the UE. In a first method, if the UE already had a valid cell identifier (C-RNTI) allocated in a corresponding cell prior to the random access procedure, the UE transmits its own cell identifier through an uplink transmission signal corresponding to the UL grant. On the other hand, if a valid cell identifier was not allocated to the UE prior to a random access procedure, the UE includes its own unique identifier (e.g., S-TMSI or random number) in an uplink transmission signal and transmits the uplink transmission signal. In general, the unique identifier is longer than a C-RNTI.

In transmission on an UL-SCH, UE-specific scrambling is used. If a C-RNTI was allocated to the UE, the scrambling is performed based on the C-RNTI. However, if the C-RNTI was not yet allocated to the UE, the scrambling cannot be performed based on the C-RNTI, and instead, a TC-RNTI received in a random access response is used. If the UE transmitted data corresponding to the UL grant, it initiates a contention resolution timer.

(4) Fourth Message (Msg 4, Message 4)

If the eNB receives a C-RNTI of the UE from the corresponding UE through the third message, the eNB sends a fourth message to the UE using the received C-RNTI. On the other hand, when the eNB receives a unique identifier (i.e., S-TMSI or random number) from the UE through the third message, the eNB sends the fourth message to the UE using a TC-RNTI allocated to the corresponding UE in a random access response. For example, the fourth message may include a RRC connection setup message.

The UE transmits data including its own identifier through the UL grant included in the random access response, and then waits for an instruction of the eNB for the contention resolution. That is, the UE attempts to receive a PDCCH in order to receive a specific message. There are two methods for receiving the PDCCH. As described above, if the identifier of the UL in the third message transmitted in response to the UL grant is C-RNTI, the UE attempts to receive the PDCCH using its own C-RNTI, and if the identifier of the UL is a unique identifier (i.e., S-TMSI or random number), the UE attempts to receive the PDCCH using a TC-RNTI included in the random access response. Thereafter, in the former case, if the UE received the PDCCH through its own C-RNTI before the contention resolution timer expires, the UE determines that the random access procedure has been normally performed, and terminates the random access procedure. In the latter case, if the UE received the PDCCH through the TC-RNTI before the contention resolution timer expires, the UE checks data to which a PDSCH indicated by the PDCCH is transferred. If the unique identifier of the UE was included in contents of the data, the UE determines that the random access procedure has been normally performed, and terminates the random access procedure. The UE obtains the C-RNTI through the fourth message. Thereafter, the UE and a network send or receive a UE-dedicated message using the C-RNTI.

A method for a contention resolution in random access is described below.

A reason why a contention occurs in performing random access is that the number of random access preambles is basically limited. That is, because the eNB cannot allocate all the UEs a unique random access preamble for each UE, the UE randomly selects one of common random access preambles and sends the selected random access preamble. Hence, there may be a case where two or more UEs select and transmit the same random access preamble via the same radio resource (PRACH resource), but the eNB determines the received random access preamble as one random access preamble transmitted by one UE. Hence, the eNB transmits a random access response to the UE and expects that the random access response will be received by one UE. However, as described above, since the contention may occur, the two or more UEs receive one random access response and thus each perform an operation according to the reception of the one random access response. That is, there is a problem that the two or more UEs transmits different data on the same radio resource using one UL grant included in the random access response. Hence, the transmission of data may all fail, and the eNB may receive only data of a specific UE depending on location or transmission power of the UEs. In the latter case, since all the two or more UEs assume that the transmission of their data was successful, the eNB has to inform the UEs, that have failed in the contention, of information about the failure. That is, informing of information about the failure or success of the contention is called a contention resolution.

There are two methods in the contention resolution. One method is a method using a contention resolution timer, and the other method is a method of sending an identifier of a UE succeeding in the contention to other UEs. The former method is used when the UE already has a unique C-RNTI prior to a random access process. That is, the UE that has already had the C-RNTI transmits data including its own C-RNTI to the eNB in response to a random access response and runs a contention resolution timer. Further, when PDCCH information indicated by its own C-RNTI is received before the contention resolution timer expires, the UE determines that it succeeds in the contention, and normally terminates the random access. On the contrary, if the UE does not receive a PDCCH indicated by its own C-RNTI before the contention resolution timer expires, the UE determines that it fails in the contention, and may perform again the random access procedure or may inform the upper layer of the failure of the contention. In the latter method of the two contention resolution methods, that is, the method of sending an identifier of a successful UE is used when there is no unique cell identifier in the UE before the random access procedure. That is, if the UE does not have its own cell identifier, the UE includes a higher identifier (S-TMSI or random number) than the cell identifier in data based on UL grant information included in the random access response, transmits the data, and runs the contention resolution timer. If data including its own higher identifier is transmitted on a DL-SCH before the contention resolution timer expires, the UE determines that the random access procedure has succeeded. On the other hand, if the UE does not receive data including its own higher identifier on the DL-SCH before the contention resolution timer expires, the UE determines that the random access process has failed.

Unlike in the contention based random access procedure illustrated in FIG. 6, the operation in the non-contention based random access procedure is terminated by only the transmission of the first message and the second message. That is, the UE is allocated a random access preamble from the eNB before transmitting to the eNB the random access preamble as the first message, transmits to the eNB the allocated random access preamble as the first message, and receives a random access response from the eNB, thereby terminating the random connection procedure.

In 3GPP release 14, a study for a next generation mobile communication system after EPC with the following scope is under way (3GPP SP-150863).

The objective is to design a system architecture for the next generation mobile network. The new architecture shall support new RAT(s), Evolved LTE, and non-3GPP access types and minimize access dependence. Proposals for the new architecture can be based on an evolution of the current architecture or based on a "clean slate" approach.

The study shall consider scenarios of migrant to the new system architecture. The expected work will include:
  Investigation of high level architectural requirements,
  Definition of the terminology to be used as common language for architecture discussions,
  Definition of the high-level system architecture as the collection of required capabilities and high-level functions with their interactions between each other.

The architecture should be developed with the following non-exhaustive list of operational efficiency and optimization characteristics.

1. Ability to handle a rapid increase in mobile data traffic/number of devices due to existing and new communication services in a scalable manner
2. Allow independent evolution of core and radio networks
3. Support of technologies (e.g., network function virtualization and software defined networking) to reduce the total cost of ownership, improve operational efficiency, energy efficiency, and simplicity, and support flexibility for offering new services.

Next Generation System (NGS)

In 3GPP for a design of a next generation mobile network system, i.e., 5G core network, service requirements have been defined through a study called SMARTER (Services and Markets Technology Enablers). Further, in SA2, FS NextGen (Study on Architecture for Next Generation System) study is being carried out based on this.

The following definitions for NGS has been defined in TR 23.799.
  Evolved E-UTRA: is an evolved RAT of the E-UTRA radio interface for operation in the NextGen system;
  Network Capability: is a network provided and 3GPP specified feature that is not typically used as a separate or standalone "end user service", but rather as a component that may be combined into a remote communication service that is offered to an "end user" (for example, location service is typically not used by the "end user" to simply query the location of another UE. As a feature or network capability, the location service is used (e.g. by a tracking application) and is offered as the "end user service". Network capabilities may be used in the network internally and/or may be exposed to external users (referred to as 3rd parties);
  Network Function: is a function adopted by 3GPP or a processing function defined by 3GPP in the network and defines functional behaviour and 3GPP defined interfaces. The network function can be implemented either as a network element on a dedicated hardware, or as a software instance running on a dedicated hardware or as a virtualized function instantiated on an appropriate platform (e.g. cloud infrastructure);
  NextGen: refers to Next Generation used in the present specification;
  NextGen Core Network: Core network connected to NextGen access network;
  NextGen RAN (NG RAN): refers to a radio access network supporting one or more of the following options:
  2) Standalone New Radio
  4) Standalone New Radio is an anchor with evolved E-UTRA extension
  5) Evolved E-UTRA
  7) Evolved E-UTRA is an anchor with new radio extension
  Having common feature of RAN interfacing with next generation core;
  NextGen Access Network (NG AN): refers to NextGen RAN or non-3GPP access network and interfaces with next generation core;
  NextGen System (NG System): refers to NextGen system including NextGen access network (NG AN) and NextGen core;
  NextGen UE: UE connected to NextGen system;
  PDU connectivity service: service that provides the exchange of PDU between a UE and a data network
  PDU session: association between the UE and the data network providing the PDU connectivity service, an association type including Internet Protocol (IP) type, Ethernet type, and non-IP type;
  IP type PDU session: association between the UE and an IP data network;
  Service connectivity: the uninterrupted user experience of a service, including the cases where the IP address and/or anchoring point changes;
  Session connectivity: the continuity of a PDU session, for PDU session of IP type "session continuity" implies that the IP address is preserved for the lifetime of the PDU session.

5G System Architecture to which the Present Invention is Applicable

A 5G system is a technology advanced from the $4^{th}$ generation LTE mobile communication technology and a new radio access technology (RAT) through the evolution of the existing mobile communication network structure or a clean-state structure and an extended technology of long term evolution (LTE), and it supports extended LTE (eLTE), non-3GPP (e.g., WLAN) access and so on.

A 5G system is defined based on a service, and an interaction between network functions (NFs) within architecture for a 5G system may be expressed by two methods as follows.
  Reference point representation (FIG. 6): indicates an interaction between NF services within NFs described by a point-to-point reference point (e.g., N11) between two NFs (e.g., AMF and SMF).
  Service-based representation (FIG. 7): network functions (e.g., AMFs) within a control plane (CP) permit other authenticated network functions to access its own service. If this representation is necessary, it also includes a point-to-point reference point.

Figure 7:
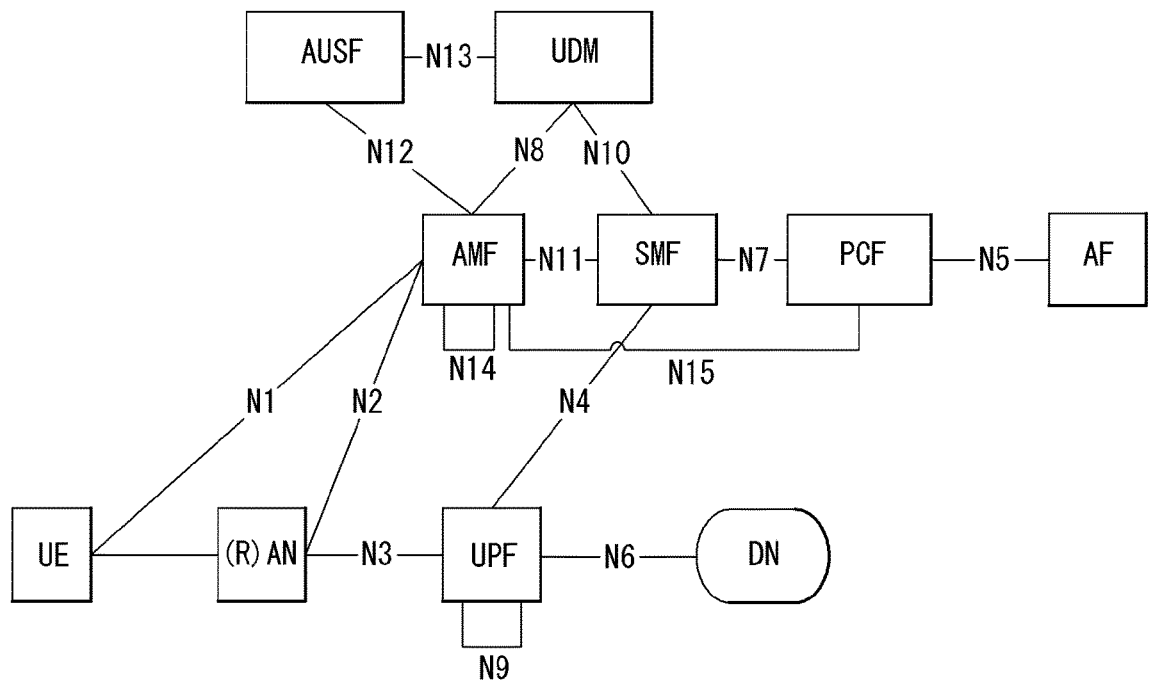
FIG. 7 illustrates a 5G system architecture using reference point representation.

FIG. 7 illustrates a 5G system architecture using reference point representation.

Referring to FIG. 7, 5G system architecture may include various components (i.e., network functions (NFs)). FIG. 7 illustrates some of the various components including an Authentication Server Function (AUSF), a (Core) Access and Mobility Management Function (AMF), a Session Management Function (SMF), a Policy Control function (PCF), an Application Function (AF), a Unified Data Management (UDM), Data network (DN), User plane Function (UPF), a (Radio) Access Network ((R)AN), and a User Equipment (UE).

Each of the NFs supports the following functions.

AUSF stores data for the authentication of a UE.

AMF provides a function for access of a UE unit and mobility management and may be basically connected to one AMF per one UE.

Specifically, the AMF supports functions, such as signaling between CN nodes for mobility between 3GPP access networks, the termination of a radio access network (RAN) CP interface (i.e., N2 interface), the termination (N1) of NAS signaling, NAS signaling security (NAS ciphering and integrity protection), AS security control, registration area management, connection management, idle mode UE reachability (including control and execution of paging retransmission), mobility management control (subscription and policy), intra-system mobility and inter-system mobility support, the support of network slicing, SMF selection, lawful interception (for an AMF event and an interface to an LI system), the provision of transfer of a session management (SM) message between a UE and an SMF, a transparent proxy for SM message routing, access authentication, access authorization including a roaming right check, the provision of transfer of an SMS message between a UE and an SMSF, a security anchor function (SEA) and/or security context management (SCM).

Some or all of the functions of the AMF may be supported within a single instance of one AMF.

DN means an operator service, Internet access or a 3rd party service, for example. The DN transmits a downlink protocol data unit (PDU) to an UPF or receives a PDU, transmitted by a UE, from a UPF.

PCF provides a function for receiving information about a packet flow from an application server and determining a policy, such as mobility management and session management. Specifically, the PCF supports functions, such as the support of a unified policy framework for controlling a network behavior, the provision of a policy rule so that a CP function(s) (e.g., AMF or SMF) can execute a policy rule, and the implementation of a front end for accessing related subscription information in order to determine a policy within user data repository (UDR).

SMF provides a session management function and may be managed by a different SMF for each session if a UE has a plurality of sessions.

Specifically, the SMF supports functions, such as session management (e.g., session setup, modification and release including the maintenance of a tunnel between a UPF and an AN node), UE IP address allocation and management (optionally including authentication), the selection and control of the UP function, a traffic steering configuration for routing traffic from the UPF to a proper destination, the termination of an interface toward policy control functions, the execution of the control part of a policy and QoS, lawful interception (for an SM event and an interface to an LI system), the termination of the SM part of an NAS message, downlink data notification, the initiator of AN-specific SM information (transferred to an AN through N2 via the AMF), the determination of an SSC mode of a session, and a roaming function.

Some or all of the functions of the SMF may be supported within a single instance of one SMF.

UDM stores the subscription data of a user, policy data, etc. UDM includes two parts, that is, an application front end (FE) and user data repository (UDR).

The FE includes a UDM FE responsible for the processing of location management, subscription management and credential and a PCF responsible for policy control. The UDR stores data required for functions provided by the UDM-FE and a policy profile required by the PCF. Data stored within the UDR includes user subscription data, including a subscription ID, security credential, access and mobility-related subscription data and session-related subscription data, and policy data. The UDM-FE supports functions, such as access to subscription information stored in the UDR, authentication credential processing, user identification handling, access authentication, registration/mobility management, subscription management, and SMS management.

UPF transfers a downlink PDU, received from a DN, to a UE via an (R)AN and transfers an uplink PDU, received from a UE, to a DN via an (R)AN.

Specifically, the UPF supports functions, such as an anchor point for intra/inter RAT mobility, the external PDU session point of interconnection to a data network, packet routing and forwarding, a user plane part for the execution of packet inspection and a policy rule, lawful interception, a traffic usage report, an uplink classifier for supporting the routing of traffic flow of a data network, a branching point for supporting a multi-home PDU session, QoS handling (e.g., the execution of packet filtering, gating and an uplink/downlink rate) for a user plane, uplink traffic verification (SDF mapping between a service data flow (SDF) and a QoS flow), transport level packet marking within the uplink and downlink, downlink packet buffering, and a downlink data notification triggering function. Some or all of the functions of the UPF may be supported within a single instance of one UPF.

AF interoperates with a 3GPP core network in order to provide services (e.g., support functions, such as an application influence on traffic routing, network capability exposure access, an interaction with a policy framework for policy control).

(R)AN collectively refers to a new radio access network supporting all of evolved E-UTRA (E-UTRA) and new radio (NR) access technologies (e.g., gNB), that is, an advanced version of the 4G radio access technology.

The gNB supports functions for radio resource management (i.e., radio bearer control and radio admission control), connection mobility control, the dynamic allocation (i.e., scheduling) of resources to a UE in the uplink/downlink, Internet protocol (IP) header compression, the encryption and integrity protection of a user data stream, the selection of an AMF upon attachment of a UE if routing to the AMF has not been determined based on information provided to the UE, the selection of an AMF upon attachment of a UE, user plane data routing to an UPF(s), control plane information routing to an AMF, connection setup and release, the scheduling and transmission of a paging message (generated from an AMF), the scheduling and transmission of system broadcast information (generated from an AMF or operation and maintenance (O&M)), a measurement and measurement report configuration for mobility and scheduling, transport level packet marking in the uplink, session management, the support of network slicing, QoS flow management and mapping to a data radio bearer, the support of a UE that is an inactive mode, the distribution function of an NAS message, an NAS node selection function, radio access network sharing, dual connectivity, and tight interworking between an NR and an E-UTRA.

UE means a user device. A user apparatus may be called a term, such as a terminal, a mobile equipment (ME) or a mobile station (MS). Furthermore, the user apparatus may be a portable device, such as a notebook, a mobile phone, a personal digital assistant (PDA), a smartphone or a multimedia device, or may be a device that cannot be carried, such as a personal computer (PC) or a vehicle-mounted device.

In the drawings, for the clarity of description, an unstructured data storage network function (UDSF), a structured data storage network function (SDSF), a network exposure function (NEF) and an NF repository function (NRF) are not shown, but all of the NFs shown in this drawing may perform mutual operations along with the UDSF, NEF and NRF, if necessary.

NEF provides means for safely exposing services and capabilities provided by 3GPP network functions, for example, for a 3rd party, internal exposure/re-exposure, an application function, and edge computing. The NEF receives information from other network function(s) (based on the exposed capability(s) of other network function(s)). The NEF may store information received as structured data using a standardized interface as a data storage network function. The stored information is re-exposed to other network function(s) and application function(s) by the NEF and may be used for other purposes, such as analysis.

NRF supports a service discovery function. It receives an NF discovery request from an NF instance and provides information of a discovered NF instance to an NF instance. Furthermore, it maintains available NF instances and services supported by the available NF instances.

SDSF is an optional function for supporting a function of storing and retrieving information as structured data by any NEF.

UDSF is an optional function for supporting a function of storing and retrieving information as unstructured data by any NF.

Meanwhile, this drawing illustrates a reference model if a UE accesses one DN using one PDU session, for convenience of description, but the present invention is not limited thereto.

A UE may access two (i.e., local and central) data networks at the same time using multiple PDU sessions. In this case, for different PDU sessions, two SMFs may be selected.

In this case, each SMF may have the ability to control both a local UPF and central UPF within a PDU session.

Furthermore, a UE may access two (i.e., local and central) data networks provided within one PDU session at the same time.

In the 3GPP system, a conceptual link that connects NFs within the 5G system is defined as a reference point. The following illustrates reference points included in 5G system architecture represented in this drawing.

Figure 8:
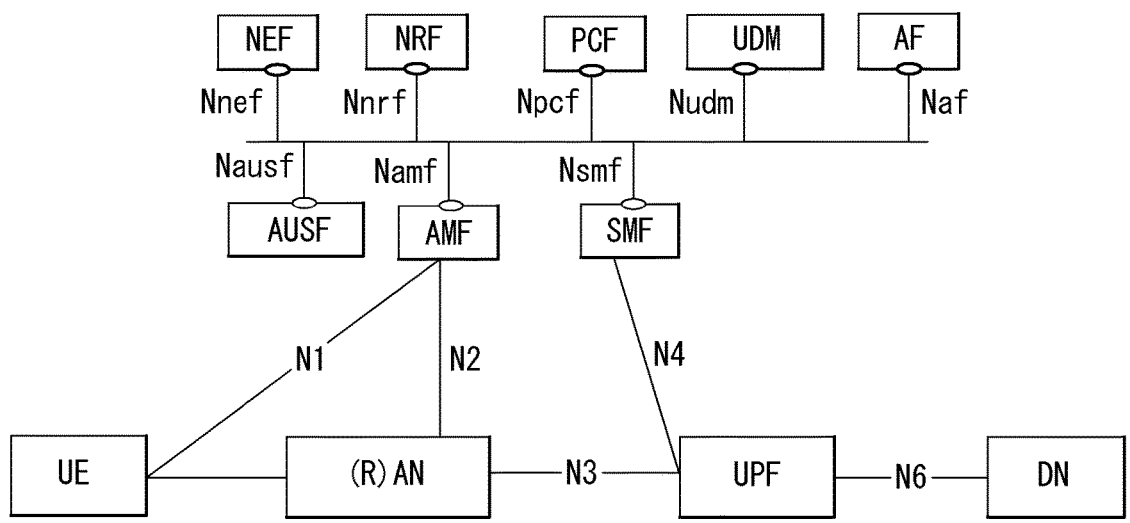
FIG. 8 illustrates a 5G system architecture using service based representation.

N1: a reference point between a UE and an AMF
N2: a reference point between an (R)AN and an AMF
N3: a reference point between an (R)AN and a UPF
N4: a reference point between an SMF and a UPF
N5: a reference point between a PCF and an AF
N6: a reference point between a UPF and a data network
N7: a reference point between an SMF and a PCF
N24: a reference point between a PCF within a visited network and a PCF within a home network
N8: a reference point between a UDM and an AMF
N9: a reference point between two core UPFs
N10: a reference point between a UDM and an SMF
N11: a reference point between an AMF and an SMF
N12: a reference point between an AMF and an AUSF
N13: a reference point between a UDM and an authentication server function (AUSF)
N14: a reference point between two AMFs
N15: a reference point between a PCF and an AMF in the case of a non-roaming scenario and a reference point between a PCF within a visited network and an AMF in the case of a roaming scenario
N16: a reference point between two SMFs (in the case of a roaming scenario, a reference point between an SMF within a visited network and an SMF within a home network)
N17: a reference point between an AMF and an EIR
N18: a reference point between any NF and an UDSF
N19: a reference point between an NEF and an SDSF FIG. 8 illustrates a 5G system architecture using service based representation.

A service-based interface illustrated in this drawing shows a set of services provided/exposed by a specific NF. The service-based interface is used within a control plane. The following illustrates service-based interfaces included in the 5G system architecture represented as in this drawing.

Namf: a service-based interface exhibited by an AMF
Nsmf: a service-based interface exhibited by an SMF
Nnef: a service-based interface exhibited by an NEF
Npcf: a service-based interface exhibited by a PCF
Nudm: a service-based interface exhibited by a UDM
Naf: a service-based interface exhibited by an AF
Nnrf: a service-based interface exhibited by an NRF
Nausf: a service-based interface exhibited by an AUSF NF service is a kind of capability exposed to another NF (i.e., NF service consumer) by an NF (i.e., NF service supplier) through a service-based interface. The NF may expose one or more NF service(s). In order to define NF service, the following criteria are applied:

NF services are derived from an information flow for describing an end-to-end function.
A complete end-to-end message flow is described by the sequence of NF service invocation.
Two operations for NF(s) to provide their services through service-based interfaces are as follows:

i) "Request-response": a control plane NF_B (i.e., NF service supplier) receives a request to provide a specific NF service (including the execution of an operation and/or the provision of information) from another control plane NF_A (i.e., NF service consumer). NF_B sends NF service results based on information provided by NF_A within a request as a response.

In order to satisfy a request, NF_B may alternately consume NF services from other NF(s). In the request-response mechanism, communication is performed in a one-to-one manner between two NFs (i.e., consumer and supplier).

ii) "Subscribe-Notify"

A control plane NF_A (i.e., NF service consumer) subscribes to an NF service provided by another control plane NF_B (i.e., NF service supplier). A plurality of control plane NF(s) may subscribe to the same control plane NF service. NF_B notifies interested NF(s) that have subscribed to NF services of the results of the NF services. A subscription request from a consumer may include a notification request for notification triggered through periodical update or a specific event (e.g., the change, specific threshold arrival, etc. of requested information). The mechanism also includes a case where NF(s) (e.g., NF_B) implicitly subscribe to specific notification without an explicit subscription request (e.g., due to a successful registration procedure).

Figure 9:
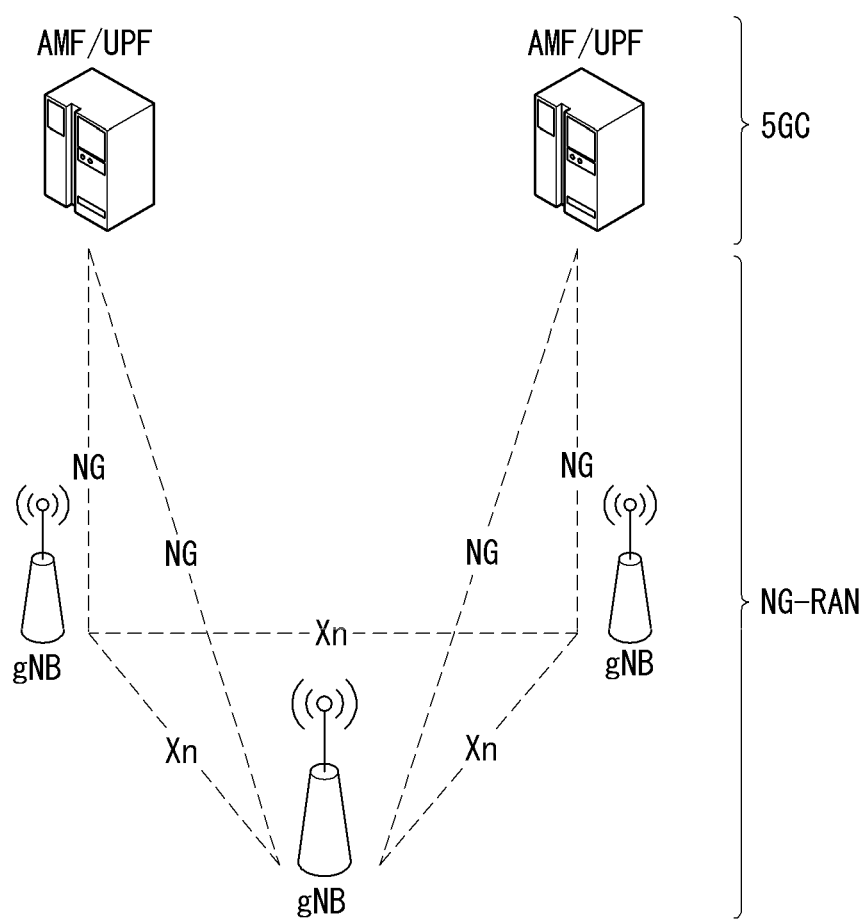
FIG. 9 illustrates a NG-RAN architecture to which the present invention is applicable.

FIG. 9 illustrates a NG-RAN architecture to which the present invention is applicable.

Referring to FIG. 9, a new generation radio access network (NG-RAN) includes gNB (NR NodeB)(s) and/or eNB (eNodeB)(s) providing a user plane toward a UE and termination of control plane protocol.

The gNB(s) are interconnected using an Xn interface, and the eNB(s) connected to the gNB(s) and 5GC are also interconnected using the Xn interface. The gNB(s) and the eNB(s) are connected to the 5GC using an NG interface. More specifically, the gNB(s) and the eNB(s) are connected to the AMF using an NG-C interface (i.e., N2 reference point) that is a control plane interface between the NG-RAN the 5GC, and are connected to the UPF using an NG-U interface (i.e., N3 reference point) that is a user plane interface between the NG-RAN and the 5GC.

Radio Protocol Architecture

Figure 10:
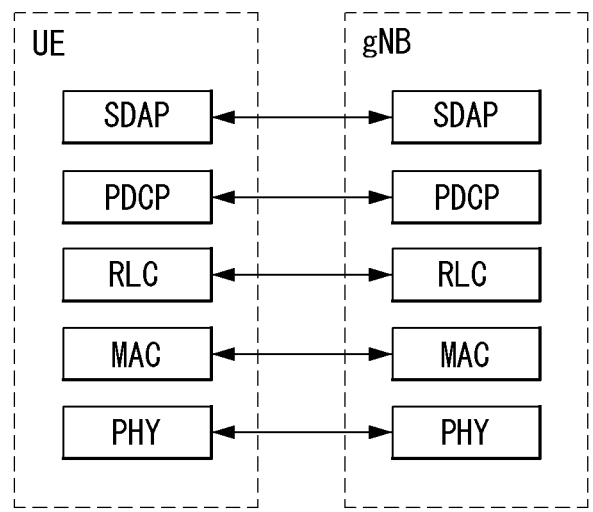
FIG. 10 illustrates a radio protocol stack to which the present invention is applicable.
Figure 10:
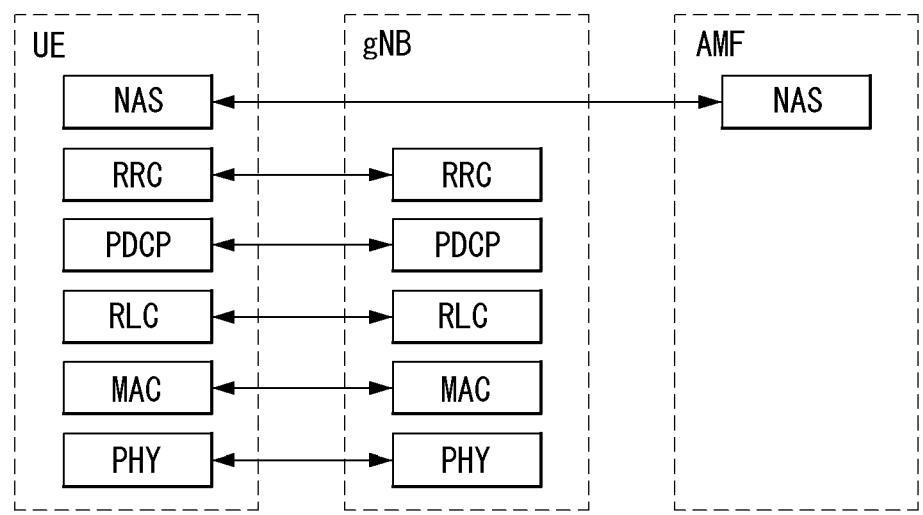

FIG. 10 illustrates a radio protocol stack to which the present invention is applicable. More specifically, FIG. 10(a) illustrates a radio interface user plane protocol stack between a UE and gNB, and FIG. 10(b) illustrates a radio interface control plane protocol stack between the UE and the gNB.

The control plane means a path through which control messages used for a UE and a network to manage calls are sent. The user plane means a path through which data generated in an application layer, for example, voice data, Internet packet data, and so on are transmitted.

Referring to FIG. 10(a), the user plane protocol stack may be divided into Layer 1 (i.e., physical (PHY) layer) and Layer 2.

Referring to FIG. 10(b), the control plane protocol stack may be divided into Layer 1 (i.e., PHY layer), Layer 2, Layer 3 (i.e., radio resource control (RRC) layer), and a non-access stratum (NAS) layer.

The second layer is divided into a medium access control (MAC) sublayer, a radio link control (RLC) sublayer, a packet data convergence protocol (PDC) sublayer, and a service data adaptation protocol (SDAP) sublayer (in the case of a user plane).

Radio bearers are classified into two groups: a data radio bearer (DRB) for user plane data and a signaling radio bearer (SRB) for control plane data Hereinafter, the layers of the control plane and user plane of the radio protocol are described.

1) The PHY layer, that is, the first layer, provides information transfer service to a higher layer using a physical channel. The PHY layer is connected to the MAC sublayer located in a high level through a transport channel. Data is transmitted between the MAC sublayer and the PHY layer through a transport channel. The transport channel is classified depending on how data is transmitted according to which characteristics through a radio interface. Furthermore, data is transmitted between different physical layers, that is, between the PHY layer of a transmission stage and the PHY layer of a reception stage through a physical channel.

2) The MAC sublayer performs mapping between a logical channel and a transport channel; the multiplexing/demultiplexing of an MAC service data unit (SDU) belonging to one logical channel or different logical channels to/from a transport block (TB) transferred to/from the PHY layer through a transport channel; a scheduling information report; error correction through a hybrid automatic repeat request (HARM); priority handling between UEs using dynamic scheduling; priority handling between the logical channels of one UE using logical channel priority; and padding.

Different types of data transfer service provided by the MAC sublayer. Each logical channel type defines that information of which type is transferred.

Logical channels are classified into two groups: a control channel and a traffic channel.

i) The control channel is used to transfer only control plane information and is as follows.
  Broadcast control channel (BCCH): a downlink channel system for broadcasting control information.
  Paging control channel (PCCH): a downlink channel transferring paging information and system information change notification.
  Common control channel (CCCH): a channel for transmitting control information between a UE and a network. This channel is used for UEs not having an RRC connection with a network.
  Dedicated control channel (DCCH): a point-to-point bidirectional channel for transmitting dedicated control information between a UE and a network. It is used by a UE having an RRC connection.

ii) The traffic channel is used to use only user plane information:
  Dedicated traffic channel (DTCH): a point-to-point channel for transferring user information and dedicated to a single UE. The DTCH may be present in both the uplink and downlink.

In the downlink, a connection between a logical channel and a transport channel is as follows.

A BCCH may be mapped to a BCH. A BCCH may be mapped to a DL-SCH. A PCCH may be mapped to a PCH. A CCCH may be mapped to a DL-SCH. A DCCH may be mapped to a DL-SCH. A DTCH may be mapped to a DL-SCH.

In the uplink, a connection between a logical channel and a transport channel is as follows. A CCCH may be mapped to an UL-SCH. A DCCH may be mapped to an UL-SCH. A DTCH may be mapped to an UL-SCH.

3) The RLC sublayer supports three transport modes: a transparent mode (TM), an unacknowledged mode (UM) and acknowledged mode (AM).

An RLC configuration may be applied to each logical channel. In the case of an SRB, the TM or AM mode is used. In contrast, in the case of a DRB, the UM or AM mode is used.

The RLC sublayer performs the transfer a higher layer PDU; independent sequence numbering with a PDCP; error correction through an automatic repeat request (ARW); segmentation and re-segmentation; the reassembly of an SDU; RLC SDU discard; and RLC re-establishment.

4) The PDCP sublayer for a user plane performs sequence numbering; header compression and compression-decompression (corresponding to only robust header compression (RoHC)); user data transfer; reordering and duplicate detection (if there is transfer to a layer higher than the PDCP); PDCP PDU routing (in the case of a split bearer); the retransmission of a PDCP SDU; ciphering and deciphering; PDCP SDU discard; PDCP re-establishment and data recovery for RLC AM; and the duplication of a PDCP PDU.

The PDCP sublayer a control plane additionally performs sequence numbering; ciphering, deciphering and integrity protection; control plane data transfer; duplication detection; the duplication of a PDCP PDU.

When duplication for a radio bearer is configured by RRC, an additional RLC entity and an additional logical channel are added to a radio bearer in order to control a duplicated PDCP PDU(s). In the PDCP, duplication includes transmitting the same PDCP PDU(s) twice. The first one is transferred to the original RLC entity, and the second one is transferred to an additional RLC entity. In this case, the duplication corresponding to the original PDCP PDU is not transmitted to the same transport block. Different two logical channels may belong to the same MAC entity (in the case of a CA) or to different MAC entities (in the case of DC). In the former case, a logical channel mapping restriction is used to guarantee that a duplication corresponding to the original PDCP PDU is not transferred to the same transport block.

5) The SDAP sublayer performs i) mapping between a QoS flow and a data radio bearer and ii) QoS flow ID marking within a downlink and uplink packet.

One protocol entity of an SDAP is configured for each PDU session, but exceptionally in the case of dual connectivity (DC), two SDAP entities may be configured.

6) The RRC sublayer performs the broadcasting of system information related to an access stratum (AS) and a non-access stratum (NAS); paging initiated by 5GC or an NG-RAN; the establishment, maintenance and release (additionally including the modification and release of a carrier aggregation and additionally including the modification and release of dual connectivity between an E-UTRAN and an NR or within an NR) of an RRC connection between a UE and an NG-RAN; a security function including key management; the establishment, configuration, maintenance and release of an SRB(s) and a DRB(s); handover and context transfer; control of UE cell selection, re-release and cell selection/reselection; a mobility function including mobility between RATs; a QoS management function, a UE measurement report and report control; the detection of a radio link failure and recovery from a radio link failure; and the transfer of an NAS message from an NAS to a UE and the transfer of an NAS message from a UE to an NAS.

Network Slicing

A 5G system has introduced a network slicing technology which provides network resources and network functions to an independent slice based on each service.

As network slicing is introduced, the isolation, independent management, etc. of a network function and network resources can be provided for each slice. Accordingly, services that are independent for each service or user and that are more flexible can be provided by selecting and combining network functions of the 5G system depending on a service or user.

A network slice refers to a network that logically integrates an access network and a core network.

The network slice may include one or more of the followings:

Core network control plane and user plane function
NG-RAN
Non-3GPP interworking function (N3IWF) toward a non-3GPP access network A function supported for each network slice and network function optimization may be different. A plurality of network slice instances may provide the same function to different groups of UEs.

One UE may be connected to one or more network slice instances at the same time via a 5G-AN. One UE may be served at the same time by a maximum of 8 network slices.

An AMF instance that serves a UE may belong to each network slice instance that serves the UE.

That is, the AMF instance may be common to a network slice instance that serves the UE. The CN part of a network slice instance(s) that serves a UE is selected by a CN.

One PDU session belongs to only a specific one network slice instance for each PLMN. Different network slice instances do not share one PDU session.

One PDU session belongs to a specific one network slice instance for each PLMN.

Different slices may have slice-specific PDU sessions using the same DNN, but different network slice instances do not share one PDU session.

Single network slice selection assistance information (S-NSSAI) identifies a network slice. Each S-NSSAI is assistant information used for a network to select a specific network slice instance. The NSSAI is a set of S-NSSAI(s). The S-NSSAI includes the followings:

Slice/service type (SST): the SST indicates the operation of a network slice expected form a viewpoint of a function and service.

Slice differentiator (SD): the SD is optional information that supplements an SST(s) for selecting a network slice instance from a plurality of potential network slice instances all of which comply with an indicated SST.

1) Upon Initial Access, Network Slice Selection

A Configured NSSAI may be configured in a UE by a home PLMN (HPLMN) for each PLMN. The Configured NSSAI becomes PLMN-specific, and the HPLMN indicates a PLMN(s) to which each Configured NSSAI has been applied.

Upon initial connection of a UE, an RAN selects an initial network slice that will transfer a message using an NSSAI. To this end, in a registration procedure, a UE provides a requested NSSAI to a network. In this case, when the UE provides the requested NSSAI to the network, a UE within a specific PLMN uses only S-NSSAIs belonging to the Configured NSSAI of the corresponding PLMN.

If a UE does not provide an NSSAI to an RAN and an RAN does not select a proper network slice based on the provided NSSAI, the RAN may select a default network slice.

Subscription data includes the S-NSSAI(s) of a network slice(s) to which a UE has subscribed. One or more S-NSSAI(s) may be marked as a default S-NSSAI. When an S-NSSAI is marked by default, although a UE does not transmit any S-NSSAI to a network within a Registration Request, the network may serve the UE through a related network slice.

When a UE is successfully registered, a CN notifies an (R)AN of all of Allowed NSSAIs (including one or more S-NSSAIs) by providing the NSSAIs. Furthermore, when the registration procedure of the UE is successfully completed, the UE may obtain an Allowed NSSAI for a PLMN from an AMF.

The Allowed NSSAI has precedence over the Configured NSSAI for the PLMN. Thereafter, the UE uses only an S-NSSAI(s) within the Allowed NSSAI corresponding to a network slice for a network slice selection-related procedure within the serving PLMN.

In each PLMN, a UE stores a Configured NSSAI and an Allowed NSSAI (if present). When the UE receives an Allowed NSSAI for a PLMN, it overrides the previously stored Allowed NSSAI for the PLMN.

2) Slice Change

A network may change an already selected network slice instance depending on a local policy and the mobility, subscription information change, etc. of a UE. That is, a set of network slices of a UE may be changed at any time while the UE is registered with a network. Furthermore, a change of a set of network slices of a UE may be initiated by a network or under specific conditions.

A network may change a set of allowed network slice(s) with which a UE has been registered based on a local policy, a subscription information change and/or the mobility of the UE. A network may perform such a change during a registration procedure or may notify a UE of a change of a supported network slice(s) using a procedure capable of triggering a registration procedure.

Upon changing the network slice, the network may provide the UE with a new Allowed NSSAI and a tracking area list. The UE includes the new NSSAI in signaling according to a mobility management procedure and transmits the signaling, thereby causing the reselection of a slice instance. An AMF supporting the slice instance may also be changed in response to a change of the slice instance.

When a UE enters an area in which a network slice is no longer available, a core network releases a PDU session for an S-NSSAI corresponding to a network slice that is no longer available through a PDU session release procedure.

When the PDU session corresponding to the slice that is no longer available is released, the UE determines whether the existing traffic can be routed through a PDU session belonging to another slice using a UE policy.

For a change of a set of used S-NSSAI(s), a UE initiates a registration procedure.

3) SMF Selection

A PCF provides a UE with a network slice selection policy (NSSP). The NSSP associates the UE with an S-NSSAI and is used by the UE in order to determine a PDU session to which traffic will be routed.

A network slice selection policy is provided for each application of a UE. This includes a rule by which an S-NSSAI can be mapped for each UE application. The AMF selects an SMF for PDU session management using subscriber information and a local operator policy along with an SM-NSSAI transferred by a UE and DNN information.

When a PDU session for a specific slice instance is established, a CN provides an (R)AN with an S-NSSAI corresponding to the slice instance to which the PDU session belongs so that an RAN can access a specific function of a slice instance.

The requirements for NGMN (Next Generation Mobile Networks) Alliance have been defined with regard to a network slicing concept.

Figure 11:
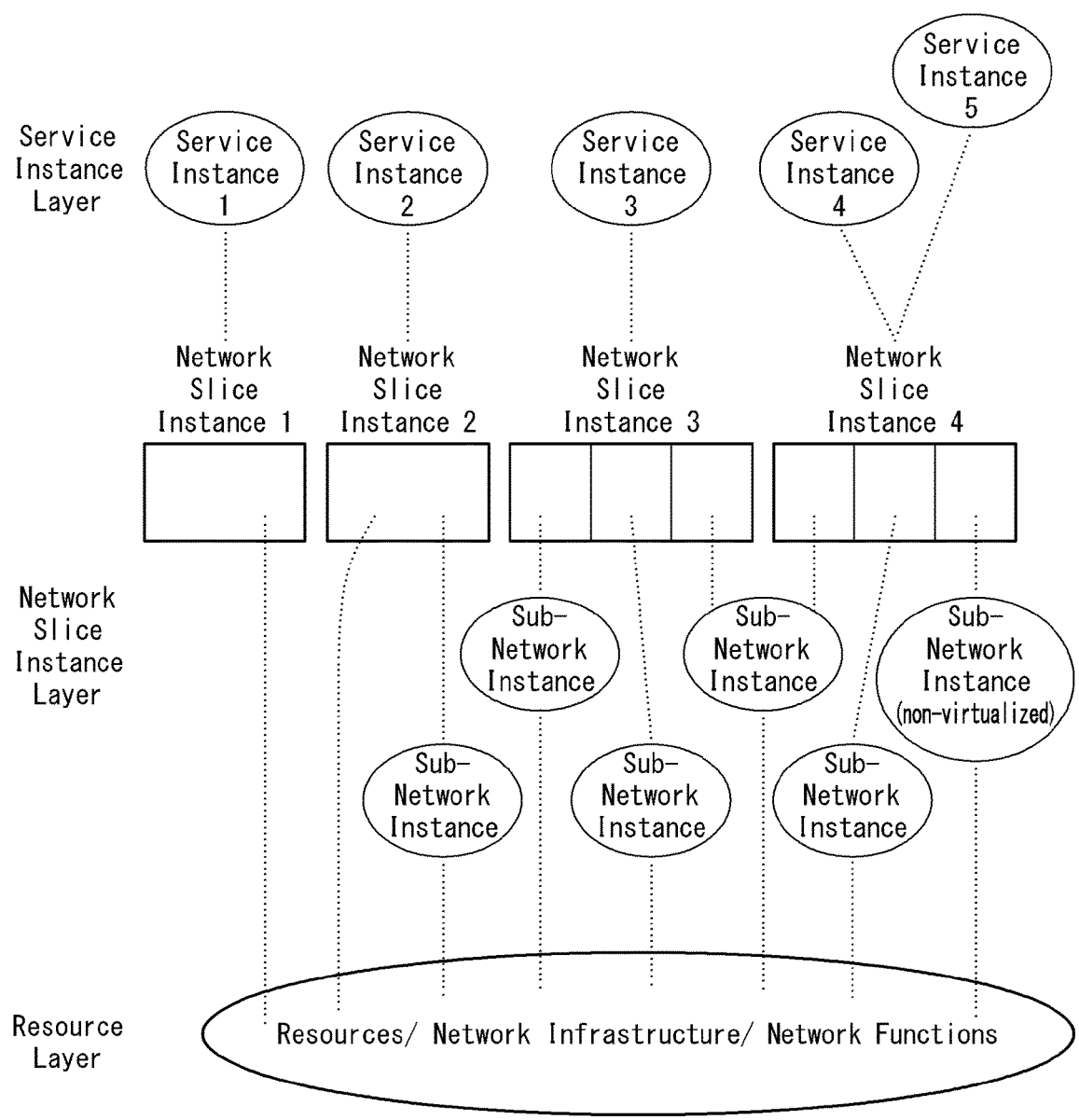
FIG. 11 illustrates a network slicing concept according to an embodiment of the present invention.

FIG. 11 illustrates a network slicing concept according to an embodiment of the present invention.

Referring to FIG. 11, a network slicing may include 3 layers of 1) service instance layer, 2) network slice instance layer, and 3) resource layer.

The service instance layer represents services (end-user service or business service) which are to be supported. Each service may be denoted by a service instance. Typically, the services may be provided by the network operator or the 3rd parties. Hence, the service instance can represent either an operator service or a 3rd party provided service.

A network operator may use a network slice blueprint to create a network slice instance. The network slice instance provides network characteristics which are required by a service instance. The network slice instance may also be shared across multiple service instances provided by the network operator.

The network slice instance may or may not consist of one or more sub-network instances which cannot be shared by another network slice instance. Similarly, a sub-network blueprint may be used to create a sub-network instance to form a set of network functions which run on the physical/logical resources.

The terminologies related to the network slicing are defined below.

Service Instance: An instance of an end-user service or a business service that is realized within or by a network slice.

Network Slice Instance: a set of network functions and resources to run these network functions, forming a complete instantiated logical network to meet certain network characteristics required by the service instance, A network slice instance may be fully or partly, logically and/or physically, isolated from another network slice instance, The resources include physical and logical resources, A network slice instance may be composed of sub-network instances which as a special case may be shared by multiple network slice instances. The network slice instance is defined by a network slice blueprint, Instance-specific policies and configurations are required when creating a network slice instance, Examples of network characteristics include ultra-low-latency, ultra-reliability etc.

Network Slice Blueprint: A complete description of structure, configuration and plans/work flows for how to instantiate and control the network slice instance during its life cycle. A network slice blueprint enables the instantiation of a network slice which provides certain network characteristics (e.g., ultra-low latency, ultra-reliability, value-added services for enterprises, etc.). A network slice blueprint refers to required physical and logical resources and/or to sub-network blueprint(s).

Sub-network Instance: A sub-network instance includes a set of network functions and the resources for these network functions, The sub-network instance is defined by a sub-network blueprint, A sub-network instance is not required to form a complete logical network, A sub-network instance may be shared by two or more network slices, The resources include physical and logical resources.

Sub-network Blueprint: A description of the structure (and contained components) of the sub-network instances and the plans/work flows for how to instantiate it, and a sub-network blueprint refers to physical and logical resources and may refer to other sub-network blueprints.

Physical Resource: A physical asset for computation, storage or transport including radio access: Network Functions are not regarded as Resources.

Logical Resource: Partition of a physical resource, or grouping of multiple physical resources dedicated to a network function or shared between a set of network functions.

Network Function (NF): Network Function refers to processing functions in a network, The NF includes but is not limited to telecom node functionality as well as switching functions (e.g., Ethernet switching function, IP routing function), VNF is a virtualized version of a NF (refer to ETSI NFV for further details on VNF).

Based on this, in SA WG1, the following potential requirements are defined through the SMARTER work.

Unlike previous 3GPP systems that attempted to provide a 'one size fits all' system, the 5G system should be able to simultaneously provide optimized support for various configurations through various means. Flexibility and adaptability on network functionality and service are a key distinguishing feature of the 5G system.

Flexibility Enabler 1: Network Slicing

One key concept to achieve a goal of flexibility is network slicing. The network slicing can allow an operator to provide dedicated logical networks with customer specific functionality while maintaining the economies of scale of a common infrastructure. It allows services to be abstracted from the network resources. As such, a variety of use cases with diverging requirements can be fulfilled. For example, there may be different requirements on functionality such as charging, policy control, security, mobility etc. The use cases may also have differences in performance requirements. For example, the latency can be reduced, and the mobility and a data rate can increase.

There is also a need to isolate the different slices from each other. The UEs can be connected to appropriate network slices at the same time in ways that fulfill the operator or the user needs, e.g., based on subscription, traffic (e.g., voice, data), or UE type.

Typically, a set of end-user services are provided by one network slice of a mobile network operator. Some UEs can simultaneously access two or more network slices for services of more diverse characteristics, e.g., MBB and critical communication. When simultaneously accessing two or more network slices, the operator can select the network slices to not duplicate a certain signaling procedure.

The network slices may consist of mainly 3GPP defined functions but may also include proprietary functions that are provided by other operators or 3rd parties. To guarantee a consistent user experience and the service support in case of roaming, slices consisting of the same network function should be available for the VPLMN user. Configuration of the network slices and provisioning of proprietary functions are based on agreements between the operators.

The network slicing may also be used to provide a network configuration enabling basic communications (e.g., voice, text message) in case of natural disasters. Another example of applying this concept may be to provide access to the network in markets where there is a need for providing access to required services with a basic Internet access (e.g., basic broadband speed, relaxed latency requirements).

The operator often provides similar service to multiple 3rd parties (e.g., enterprises) that require similar network functionalities, which should be supported in an efficient manner.

The 3GPP system shall allow the operator to create and manage network slices. A network slice consists of a set of network functions (e.g., potentially different vendors), and policies, configurations, and resources to run these network functions.

The 3GPP system shall allow the operator to dynamically create a network slice in order to form a complete, autonomous and fully operational network that is customized for different market scenarios.

The 3GPP system shall be able to associate specific services, devices, UEs, and subscribers with a particular network slice.

The 3GPP system shall enable the UE to simultaneously access the services from one or more network slices of one operator based on, for example, subscription or UE type.

The 3GPP system shall support mechanisms that enable the operator to operate and manage network slices that fulfill required criteria for different market scenarios.

The 3GPP system shall allow the operator to simultaneously operate network slices in a manner that prevents a service in one slice from negatively affecting services offered by other slices.

The 3GPP system shall have the capability to conform to security assurance requirements per service in a single network slice, rather than the whole network.

The 3GPP system shall be able to provide a level of isolation between network slices which confines a potential cyber-attack to a single network slice.

The 3GPP system shall allow the operator to authorize 3rd parties to create and manage a network slice via suitable APIs, within the limits set by the network operator.

The 3GPP system shall support the elasticity of a network slice in terms of capacity to minimize an influence on the services of this slice or other slices.

The 3GPP system shall be able to support modifications to the network slices (e.g., adding, deleting, modifying the network slices) while minimizing an influence on active subscriber services.

The 3GPP system shall be able to support end-to-end (E2E) (e.g., RAN, CN) resource management in a network slice.

The 3GPP system shall enable the operators to use the network slicing concept to efficiently support multiple 3rd parties (e.g., enterprises) that require similar network characteristics.

The 3GPP system shall enable the operators to define and identify network slices with common functionality to be available for home and roaming users.

The 3GPP system shall enable operators to specify the network functionalities that a network slice has to provide.

The 3GPP system shall support the inclusion of 3GPP defined functions as well as proprietary 3rd party or operator provided functions in a network slice.

Hosting multiple 3rd parties (e.g., enterprises) or mobile virtual network operators (MVNOs).

Serving home and roaming user.

Supporting diverse market scenarios.

The specific functional areas, for which the system should support proprietary or operator provided functions, should be identified.

The 3GPP system shall support a mechanism for the VPLMN to assign the UE to a network slice with the required functionality or to a default network slice.

The 3GPP system shall be able to change the network slice to which the UE is connected.

A network slice shall support a set of end-user services as defined by the network operator.

The 3GPP system shall enable the operator to assign the UE to a network slice based on services provided by the network slice.

The 3GPP system shall support a mechanism for an operator to authorize the UE to receive service on a specific slice in response to a request from a 3rd party.

The actual architecture requirements for the 5G system are defined through the FS NextGen study in SA2 based on service requirements of NGMN and SA1. In SA2 NextGen, the following items on the network slice are studied through Key Issue #1. 3GPP TR 23.799 v. 1.0.2 may be combined with the present disclosure with regard to the following Key Issue.

Key Issue #1: Support of Network Slicing

Network slicing enables the operator to create networks customized to provide optimized solutions for diverse market scenarios which demand diverse requirements (e.g. in the areas of functionality, performance and isolation).

Solutions for this key issue are as follows.

Functionality and capabilities within 3GPP scope that enables the next generation system to support the network slicing and network slicing roaming requirements defined in TR 22.864 [7] and in normative stage 1 specifications (when available) including but not limited to:

How to achieve isolation/separation between network slice instances and which levels and types of isolation/separation will be required;

How and what type of resource and network function sharing can be used between network slice instances Details of which resources are meant and how they relate to the 3GPP architecture are to be clarified as part of the solutions to the key issue.

How to enable a UE to simultaneously obtain services from one or more specific network slice instances of one operator;

What is within 3GPP scope with regards to network slicing (e.g. network slice creation/composition, modification, deletion);

Which network functions may be included in a specific network slice instance, and which network functions are independent of network slices;

The procedure(s) for selection of a particular network slice for a UE;

How to support network slicing roaming scenarios; and

How to enable the operators to use the network slicing concept and to efficiently support multiple 3rd parties (e.g. enterprises, service providers, content providers, etc.) that require similar network characteristics.

Solutions for the Key issue #1 are described below. The TR 23.799 v1.1.0 document may be combined with the present disclosure with regard to the corresponding solutions.

1. The network slice is a complete logical network (providing telecommunication services and network function capabilities) including AN and CN.

a) AN may be common to multiple network slices.

b) Network slices may differ for supported functionality and network function optimization use cases.

c) Networks may deploy multiple network slice instances providing the same optimization and feature as per each of different groups of UEs, but are not dedicated to them. It is because the network slice instances may provide different dedicated services or may be dedicated to a customer.

(Networks may deploy multiple Network slice instances delivering exactly the same optimization and features as per but dedicated to different groups of UEs, e.g. as they deliver a different committed service and/or because they may be dedicated to a customer.)

2. A UE may provide network slice selection assistance information (NSSAI) consisting of a set of parameters to the network to select a set of RAN and CN parts of the network slice instances (NSIs) for the UE.

a) The NSSAI may have standard values or PLMN specific values for the slice/service type.

b) The UE may store a configured NSSAI per PLMN.

c) If the UE stores NSSAI for an ID of the PLMN that the UE accesses, the UE provides NSSAI to RRC and NAS. The NSSAI indicates slice/service type, which refers to the expected network behaviour in terms of functionality and services. The RAN uses NSSAI for routing initial access to common control network functions (CCNFs) (corresponding to the above-described AMF).

The UE may additionally provide NSSAI to RRC and NAS that complement the slice/service type(s) by differentiation in order to select among potentially multiple network slice instances that all comply with the indicated slice/service type(s).

d) If the UE doesn't store any accepted NSSAI for the ID of the PLMN that the UE accesses, the UE provides the configured NSSAI to RRC and NAS when storing a configured NSSAI. If the UE stores the configured NSSAI, the UE provides it to the PLMN. Otherwise, the UE may provide a configured default NSSAI (if the UE stores the default NSSAI). RAN may use NSSAI for routing the initial access to a CCNF. If the UE doesn't store any NSSAI for the ID (accepted or configured) of the PLMN that the UE accesses and there is also no configured default NSSAI, the UE provides no NSSAI to RRC and NAS, and the RAN may send NAS signaling to a default NF.

e) After (initial) slice selection, attachment provides the UE with a Temp ID that is provided by the UE via RRC during a subsequent access, in order to enable the RAN to route the NAS message to the appropriate CCNF as long as the Temp ID is valid. In addition, the serving PLMN may return an Accepted NSSAI that the UE stores for the PLMN ID of the serving PLMN. If the UE stores an Accepted NSSAI for the PLMN ID of the serving/selected PLMN, the UE can indicate the corresponding Accepted NSSAI always, when NSSAI needs to be indicated.

f) For a "Service Request", the UE has a registered/updated and valid temp ID and enables the RAN to route the request to the serving common CP NF via the temp ID. It is assumed that the slice configuration does not change within a registration area of the UE.

g) For enabling routing of a TA update request, the UE may include always Accepted NSSAI and a complete Temp ID in RRC.

h) "SM NSSAI" that the UE shall include in the PDU session establishment Request, shall enable the selection of an SM-NF.

3. If a network deploys network slicing, the UE may use UE-provided network slice selection assistance information to select a network slice. In addition, the UE capabilities and UE subscription may be used.

4. The UE may access multiple slices simultaneously via a single RAN. In such case, those slices may share some control plane functions (e.g., MMF (Mobility Management Function), AUF (Authentication Function)). These common functions are collectively identified as CCNF (Common Control Network Functions).

5. The CN part of network slice instance(s) serving a UE is selected by CN not RAN.

6. It shall be possible to handover a UE from a slice of NGC to a DCN of EPC. There is no need to necessarily establish a one-to-one mapping between the slice and the DCN.

7. The UE need to be able to associate an application with one of multiple parallel established PDU sessions. Different PDU sessions may belong to different slices.

Session Management

5GC supports a PDU connectivity service, that is, a service that provides the exchange of PDU(s) between a UE and a DN identified by a data network name (DNN) (or an access point name (APN)). The PDU connectivity service is also supported through a PDU session established upon request from the UE.

Each PDU session supports a single PDU session type. That is, when the PDU session is established, it supports the exchange of PDUs of a single type requested by a UE. The following PDU session types are defined. IP version 4 (IPv4), IP version 6 (IPv6), Ethernet, and unstructured. In this case, the type of PDUs exchanged between a UE and a DN are completely transparent in a 5G system.

A PDU session is established using NAS SM signaling exchanged between a UE and an SMF through N1 (upon UE request), modified (upon UE and 5GC request), and released (upon UE and 5GC request). Upon request from an application server, 5GC may trigger a specific application within a UE. When the UE receives a trigger message, it transfers the corresponding message to an identified application. The identified application may establish a PDU session with a specific DNN.

An SMF checks whether a UE request complies with user subscription information. To this end, the SMF obtains SMF level subscription data from UDM. Such data may indicate an accepted PDU session type for each DNN:

A UE registered through a plurality of accesses selects access for setting up a PDU session.

A UE may request to move a PDU session between 3GPP and non-3GPP access. A determination for moving the PDU session between 3GPP and non-3GPP access is made for each PDU session. That is, the UE may have a PDU session using 3GPP access while another PDU session uses non-3GPP access.

Within a PDU session setup request transmitted by a network, a UE provides a PDU session identity (ID). Furthermore, the UE may provide a PDU session type, slicing information, a DNN, service and a session continuity (SSC) mode.

A UE may establish a plurality of PDU sessions with the same DN or different DNs at the same time via 3GPP access and/or via non-3GPP access.

A UE may establish a plurality of PDU sessions with the same DN served by a different UPF end N6.

A UE having a plurality of established PDU sessions may be served by different SMFs.

The user plane path of a different PDU sessions belonging to the same UE (the same or different DNNs) may be fully separated between an UPF and AN interfacing with a DN.

5G system architecture can satisfy various continuity requirements of different application/services within a UE by supporting a session and service continuity (SCC). A 5G system supports different SSC modes. An SSC mode associated with a PDU session anchor is not changed while a PDU session is established.

In the case of a PDU session to which SSC Mode 1 is applied, a network maintains continuity service provided to a UE. In the case of a PDU session of an IP type, an IP address is maintained.

If SSC Mode 2 is used, a network may release continuity service delivered to a UE. Furthermore, the network may release a corresponding PDU session. In the case of a PDU session of an IP type, a network may release an IP address(s) allocated to a UE.

If SSC Mode 3 is used, a change of a user plane can be aware by a UE, but a network guarantees that the UE does not lose connectivity. In order to permit better service continuity, a connection through a new PDU session anchor point is established before a previous connection is terminated. In the case of a PDU session of an IP type, an IP address is not maintained while an anchor is deployed again.

An SSC mode selection policy is used to determine the type of SSC mode associated with an application (or application group) of a UE. An operator may previously configure an SSC mode selection policy in a UE. The policy includes one or more SSC mode selection policy rules which may be used for a UE to determine the type of SSC mode associated with an application (or a group of applications). Furthermore, the policy may include a default SSC mode selection policy rule which may be applied to all of applications of a UE.

If a UE provides an SSC mode when it requests a new PDU session, an SMF selects whether it will accept the requested SSC mode or whether it will modify the requested SSC mode based on subscription information and/or a local configuration. If a UE does not provide an SSC mode when it requests a new PDU session, an SMF selects a default SSC mode for data networks listed within subscription information or applies a local configuration for selecting an SSC mode.

An SMF notifies a UE of an SSC mode selected for a PDU session.

Mobility Management

Registration management (RM) is used to register or deregister a UE/user with/from a network and to establish user context within a network.

1) Registration Management

A UE/user needs to register a network in order to receive service that requests registration. Once the UE/user is registered, the UE may update its own registration with the network in order to periodically maintain reachability (periodical registration update) if applicable, upon moving (mobility registration update), or in order to update its own capability or negotiate a protocol parameter again.

An initial registration procedure includes the execution of a network access control function (i.e., user authentication and access authentication based on a subscription profile within UDM). As the results of the registration procedure, the ID of a serving AMF within the UDM is registered.

Figure 12:
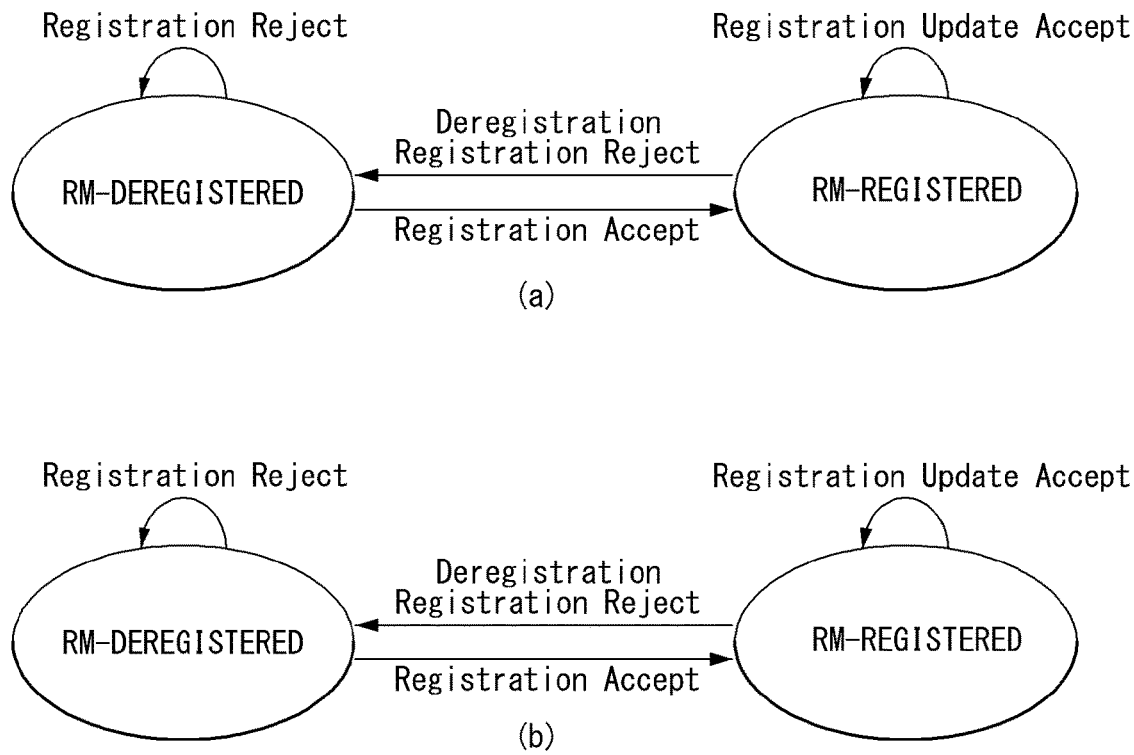
FIG. 12 illustrates RM state models to which the present invention is applicable.

FIG. 12 illustrates RM state models to which the present invention is applicable. Specifically, FIG. 10(*a*) illustrates an RM state model in a UE, and FIG. 10(*b*) illustrates an RM state model in an AMF.

Referring to FIG. 10, in order to reflect the registration state of a UE within a selected PLMN, two RM states of RM-DEREGISTERED and RM-REGISTERED are used within the UE and the AMF.

In the RM-DEREGISTERED state, the UE is not registered with a network. The valid location or routing information of UE context within the AMF is not maintained. Accordingly, the UE is not reachable by the AMF. However, for example, in order to prevent an authentication procedure from being executed for each registration procedure, some UE context may be still stored in the UE and the AMF.

In the RM-DEREGISTERED state, if the UE needs to receive service that requests registration, the UE attempts registration with a selected PLMN using the initial registration procedure. Alternatively, upon initial registration, when the UE receives a Registration Reject, the UE remains in the RM-DEREGISTERED state. In contrast, when the UE receives the Registration Accept, it enters the RM-REGISTERED state.

In the RM-DEREGISTERED state, if applicable, the AMF accepts the initial registration of the UE by transmitting a Registration Accept to the UE, and enters the RM-REGISTERED state. Alternatively, if applicable, the AMF rejects the initial registration of the UE by transmitting a Registration Reject to the UE.

In the RM-REGISTERED state, the UE is registered with the network. In the RM-REGISTERED state, the UE may receive service that requests registration with the network.

In the RM-REGISTERED state, if the tracking area identity (TAI) of a current serving cell is not present within a list of TAIs that has been received by the UE from a network, the registration of the UE is maintained. The UE performs a mobility registration update procedure so that the AMF can page the UE. Alternatively, in order to notify a network that the UE is still in the active state, the UE performs a periodic registration update procedure when a periodical update timer expires. Alternatively, in order to update its own capability information or negotiate a protocol parameter with a network again, the UE performs a registration update procedure. Alternatively, if the UE does no longer require registration with a PLMN, the UE performs a deregistration procedure and enters the RM-DEREGISTERED state. The UE may determine deregistration from the network at any time. Alternatively, when the UE receives a Registration Reject message, a Deregistration message or performs a local deregistration procedure without the initiation of any signaling, it enters the RM-DEREGISTERED state.

In the RM-REGISTERED state, when the UE does no longer need to be registered with the PLMN, the AMF performs a deregistration procedure and enters the RM-DEREGISTERED state. The AMF may determine the deregistration of the UE at any time. Alternatively, after an implicit deregistration timer expires, the AMF performs implicit deregistration at any time. The AMF enters the RM-DEREGISTERED state after the implicit deregistration. Alternatively, the AMF performs local deregistration for the UE that has negotiated deregistration at the end of communication. The AMF enters the RM-DEREGISTERED state after local deregistration. Alternatively, if applicable, the AMF accepts or rejects registration update from the UE. The AMF may reject UE registration when it rejects the registration update from the UE.

Registration area management includes a function for allocating or re-allocating a registration area to the UE. The registration area is managed for each access type (i.e., 3GPP access or non-3GPP access).

When the UE is registered with a network through 3GPP access, the AMF allocates a set of tracking area (TA)(s) within a TAI list to the UE. When the AMF allocates a registration area (i.e., a set of TAs within the TAI list), the AMF may consider various types of information (e.g., a mobility pattern and an accepted/non-accepted area). The AMP having the whole PLMN or all of PLMNs as a serving area may allocate the whole PLMN, that is, a registration area, to the UE in the MICO mode.

A 5G system supports the allocation of a TAI list including different 5G-RAT(s) within a single TAI list.

When the UE is registered with a network through non-3GPP access, a registration area for the non-3GPP access corresponds to a unique reserved TAI value (i.e., dedicated to the non-3GPP access). Accordingly, there is a unique TA for the non-3GPP access to 5GC, which is called an N3GPP TAI.

When the TAI list is generated, the AMF includes only a TAI(s) applicable to access through which the TAI list has been transmitted.

2) Connection Management

Connection management (CM) is used to establish and release a signaling connection between the UE and the AMF. CM includes a function of establishing and releasing a signaling connection between the UE and the AMF through N1. The signaling connection is used to enable an NAS signaling exchange between the UE and a core network. The signaling connection includes both an AN signaling connection for the UE between the UE and the AN and an N2 connection for the UE between the AN and the AMF.

Figure 13:
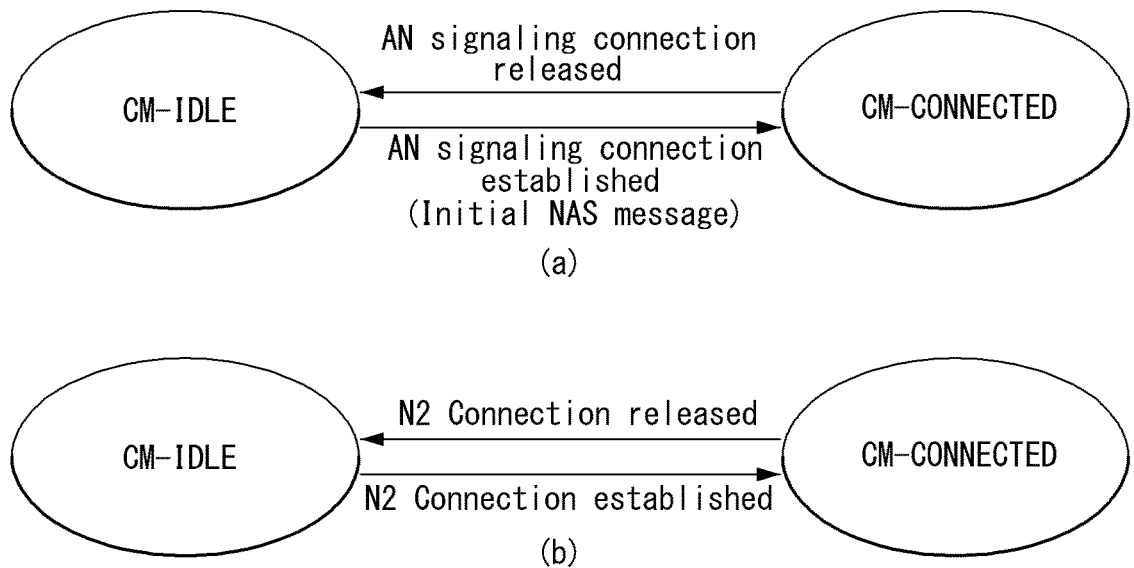
FIG. 13 illustrates CM state models to which the present invention is applicable.

FIG. 13 illustrates CM state models to which the present invention is applicable. Specifically, FIG. 11(a) illustrates CM state transition in the UE, and FIG. 11(b) illustrates CM state transition in the AMF.

Referring to FIG. 13, two CM states of CM-IDLE and CM-CONNECTED states are used to reflect NAS signaling connection of the UE with the AMF.

The UE in the CM-IDLE state is the RM-REGISTERED state and does not have an NAS signaling connection established with the AMF through N1. The UE performs cell selection, cell reselection and PLMN selection.

An AN signaling connection, an N2 connection and an N3 connection for the UE in the CM-IDLE state are not present.

In the CM-IDLE state, if the UE is not in the MICO mode, it responds to paging by performing a Service Request procedure (if it has received it). Alternatively, when the UE has uplink signaling or user data to be transmitted, it performs a Service Request procedure. Alternatively, whenever an AN signaling connection is established between the UE and the AN, the UE enters the CM-CONNECTED state. Alternatively, the transmission of an initial NAS message (Registration Request, Service Request or Deregistration Request) starts to shift from the CM-IDLE state to the CM-CONNECTED state.

In the CM-IDLE state, if the UE is not in the MICO mode, when the AMF has signaling or the mobile-terminated data to be transmitted to the UE, it performs a network-triggered service request procedure by transmitting a paging request to the corresponding UE. Whenever an N2 connection for a corresponding UE between the AN and the AMF is established, the AMF enters the CM-CONNECTED state.

The UE in the CM-CONNECTED state has an NAS signaling connection with the AMF through N1.

In the CM-CONNECTED state, whenever the AN signaling connection is released, the UE enters the CM-IDLE state.

In the CM-CONNECTED state, whenever an N2 signaling connection and N3 connection for the UE are released, the AMF enters the CM-IDLE state.

When an NAS signaling procedure is completed, the AMF may determine to release the NAS signaling connection of the UE. When the AN signaling connection release is completed, the CM state within the UE changes to the CM-IDLE. When an N2 context release procedure is completed, the CM state for the UE within the AMF changes to the CM-IDLE.

The AMF may maintain the UE in the CM-CONNECTED state until the UE is deregistered from a core network.

The UE in the CM-CONNECTED state may be an RRC Inactive state. When the UE is in the RRC Inactive state, UE reachability is managed by an RAN using assistant information from a core network. Furthermore, when the UE is in the RRC Inactive state, UE paging is managed by the RAN. Furthermore, when the UE is in the RRC Inactive state, the UE monitors paging using the CN and RAN ID of the UE.

The RRC Inactive state is applied to an NG-RAN (i.e., applied to an NR and E-UTRA connected to 5G CN).

The AMF provides assistant information to the NG-RAN in order to assist the determination of the NG-RAN regarding whether the UE will be changed to the RRC Inactive state based on a network configuration.

The RRC Inactive assistant information includes a UE-specific discontinuous reception (DRX) value for RAN paging during the RRC Inactive state and a registration area provided to the UE.

CN assistant information is provided to a serving NG RAN node during N2 activation (i.e., registration, a service request or path switch).

The state of an N2 and the N3 reference point is not changed by the UE that enters the CM-CONNECTED state accompanied by RRC Inactive. The UE in the RRC Inactive state is aware of an RAN notification area.

When the UE is the CM-CONNECTED state accompanied by RRC Inactive, the UE may resume an RRC connection due to uplink data pending, a mobile-initiated signaling procedure (i.e., periodical registration update), a response to RAN paging, or when the UE notifies a network that it has deviated from the RAN notification area.

When the connection of the UE in a different NG-RAN node within the same PLMN resumes, UE AS context is recovered from an old NG RAN node, and the procedure is triggered toward a CN.

When the UE is in the CM-CONNECTED state accompanied by RRC Inactive, the UE performs cell selection on a GERAN/UTRAN/EPS and complies with an idle mode procedure.

Furthermore, the UE in the CM-CONNECTED state accompanied by RRC Inactive enters the CM-IDLE mode and complies with an NAS procedure related to the following cases.

If an RRC resumption procedure fails,

If a movement to the CM-IDLE mode of the UE is required within a failure scenario that cannot be solved in the RRC Inactive mode.

The NAS signaling connection management includes a function for establishing and releasing an NAS signaling connection.

The NAS signaling connection establishment function is provided by the UE and the AMF in order to establish the NAS signaling connection of the UE in the CM-IDLE state.

When the UE in the CM-IDLE state needs to transmit an NAS message, the UE initiates a service request or registration procedure in order to establish a signaling connection to the AMF.

The AMF may maintain the NAS signaling connection until the UE is deregistered from a network based on the preference of the UE, UE subscription information, a UE mobility pattern and a network configuration.

The procedure of releasing the NAS signaling connection is initiated by a 5G (R)AN node or the AMF.

When the UE detects the release of an AN signaling connection, the UE determines that the NAS signaling connection has been released. When the AMF detects that N2 context has been released, the AMF determines that the NAS signaling connection has been released.

3) UE Mobility Restriction

A mobility restriction restricts the service access or mobility control of a UE within a 5G system. A mobility restriction function is provided by a UE, an RAN and a core network.

The mobility restriction is applied to only 3GPP access, but is not applied to non-3GPP access.

In the CM-IDLE state and the CM-CONNECTED state accompanied by RRC Inactive, a mobility restriction is performed by a UE based on information received from a core network. In the CM-CONNECTED state, a mobility restriction is performed by an RAN and a core network.

In the CM-CONNECTED state, a core network provides a handover restriction list for a mobility restriction to an RAN.

The mobility restriction includes an RAT restriction, a forbidden area and a service area restriction as follows:

RAT restriction: the RAT restriction is defined as a 3GPP RAT(s) whose access of a UE is not permitted. A UE within a restricted RAT is not allowed to initiate any communication with a network based on subscription information.

Forbidden area: a UE is not allowed to initiate any communication with a network based on subscription information within a forbidden area under a specific RAT.

Service area restriction: it defines an area in which a UE can initiate cannot initiate communication with a network as follows:

Allowed area: if a UE is allowed by subscription information within an allowed area under a specific RAT, the UE is allowed to initiate communication with a network.

Non-allowed area: a service area for a UE is restricted based on subscription information within a non-allowed area under a specific RAT. The UE and the network are not allowed to initiate session management signaling for obtaining a service request or user service (both the CM-IDLE state and the CM-CONNECTED state). The RM procedure of the UE is the same as that in the allowed area. A UE within a non-allowed area responds to the paging of a core network as a service request.

In a specific UE, a core network determines a service area restriction based on UE subscription information. Optionally, an allowed area may be fine-tuned by a PCF (e.g., based on a UE location, a permanent equipment identifier (PEI) or a network policy). The service area restriction may be changed due to subscription information, a location, a PEI and/or a policy change, for example. The service area restriction may be updated during a registration procedure.

If a UE has an RAT restriction, a forbidden area, an allowed area, a non-allowed area or an area overlapping between them, the UE performs an operation according to the following priority:

The evaluation of the RAT restriction has precedence over the evaluation of any other mobility restriction;

The evaluation of the forbidden area has precedence over the evaluation of the allowed area and the non-allowed area; and The evaluation of the non-allowed area has precedence over the evaluation of the allowed area.

4) Mobile Initiated Connection Only (MICO) Mode

A UE may indicate the preference of the MICO mode during initial registration or registration update. The AMF determines whether the MICO mode is permitted for the UE based on a local configuration, the preference indicated by the UE, UE subscription information and a network policy or a combination of them, and notifies the UE of the results during a registration procedure.

A UE and a core network re-initiates or exits from the MICO mode in the following registration signaling. If the MICO mode is not clearly indicated within a registration procedure and a registration procedure is successfully completed, the UE and the AMF do not use the MICO mode. That is, the UE operates as a general UE, and the network also treats a corresponding UE as a general UE.

The AMF allocates a registration area to a UE during a registration procedure. When the AMF indicates the MICO mode for the UE, the registration area is not restricted as a paging area size. If the AMF serving area is the whole PLMN, the AMF may provide the UE with the "whole PLMN" registration area. In this case, re-registration with the same PLMN attributable to mobility is not applied. If a mobility restriction is applied to a UE in the MICO mode, the AMF allocates an allowed area/non-allowed area to the UE.

When the AMF indicates the MICO mode for the UE, the AMF considers that the UE is always unreachable during the CM-IDLE state. The AMF rejects any request for downlink data transfer for a corresponding UE that is in the MICO mode and the CM-IDLE state. The AMF also delays downlink transport, such as SMS or location service through the NAS. A UE in the MICO mode may be reachable for mobile-terminated data or signaling only when the UE is in the CM-CONNECTED mode.

The AMF may provide an RAN node with pending data indication when a UE in the MICO mode can immediately transport mobile-terminated data and/or signaling when the UE switches to the CM-CONNECTED mode. When the RAN node receives the indication, the RAN node considers the information when it determines user inactivity.

A UE in the MICO mode does not need to listen to paging during the CM-IDLE state. The UE in the MICO mode may stop any AS procedure within the CM-IDLE state until it starts switching from the CM-IDLE to the CM-CONNECTED mode due to one of the following reasons.

Figure 14:
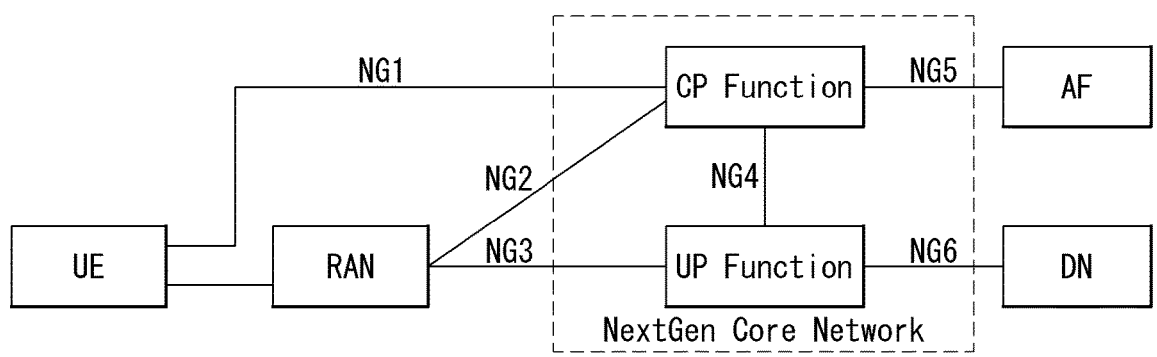
FIG. 14 illustrates a 5G system architecture to which the present invention is applicable.

If a change (e.g., configuration change) within the UE requires registration update to a network
If a periodic registration timer expires
If MO data is pending
If MO signaling is pending FIG. 14 illustrates a 5G system architecture to which the present invention is applicable. This figure is a more simplified figure of FIG. 7, and the description described in FIG. 7 may be equally applied.

FIG. 14 illustrates a reference model of a potential architecture including potential functional entities and potential reference points. The naming of the reference points may be used in individual solution proposals for a better understanding and comparison. This reference model does not make any assumption on the actual target architecture. That is, the target architecture may not include all of the illustrated reference points or functional entities or may include additional/other reference points or functional entities.

Referring to FIG. 14, the 5G system architecture may include various components (i.e., network functions (NFs)). This figure illustrates an application function (AF), a data network (DN), a user plane function (UPF), a control plane function (CPF), a (radio) access network ((R)AN), and a user equipment (UE) corresponding to some of the various components.

In FIG. 14, the control plane function and the user plane function of the NextGen core are depicted as single boxes (CP function and UP function, respectively). Individual solution proposals may split or replicate CP or UP functions. In this case, the naming of additional reference points could add indexes to the illustrated reference points (e.g., NG4.1, NG4.2).

RAN here refers to a radio access network based on the <5G> RAT or Evolved E-UTRA connected to the NextGen core network.

In the 3GPP system, a conceptual link that connects NFs within a 5G system is defined as a reference point. The following illustrates reference points included in the 5G system architecture represented in this figure.

NG1: Reference point between the UE and the CPF
NG2: Reference point between the (R)AN and the CPF
NG3: Reference point between the (R)AN and the UPF
NG4: Reference point between the UPF and the CPF
NG5: Reference point between the CPF and the AF
NG6: Reference point between the UPF and the DN Some reference points illustrated in the figure may consist of several reference points depending on how the CP functions and UP functions may be further split.

Figure 15:
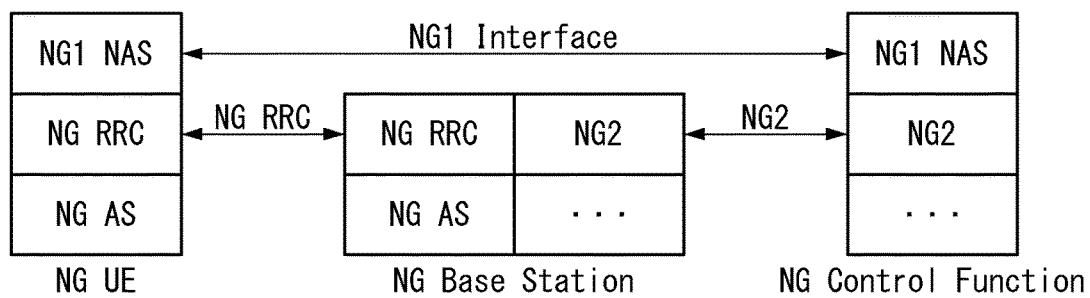
FIG. 15 illustrates a protocol stack between a UE and a core network considered in a next generation system according to an embodiment of the present invention.

FIG. 15 illustrates a protocol stack between a UE and a core network considered in a next generation system according to an embodiment of the present invention.

NG1 may play a role similar to a NAS protocol of EPS, and NG2 may play a role similar to a S1-AP of EPS. NG RRC and NG AS respectively correspond to existing LTE RRC and LTE AS or respectively correspond to NR RRC and NR AS of NR which are newly being standardized, and RRCs of all two RATs are expected to be based on current LTE RRC.

Method for Selecting UE-Provided NSSAI Based Network Slice

As described above, a general concept of network slicing with regard to NSSAI is as follows.

1. A UE may provide a network slice selection assistance information (NSSAI) consisting of a set of parameters to the network to select a set of RAN and CN parts of NSI(s) for the UE.

2. The NSSAI (used to select CCNF) is a collection of SM-NSSAIs to enable the network to select a particular slice. The NSSAI may be basically divided into the following two types.

Configured NSSAI: NSSAI configured by default in a UE to be used in a PLMN before any interaction with the PLMN occurs
Accepted NSSAI: NSSAI used by the UE after the PLMN has accepted an Attach Request from the UE The following raises some issues to be determined with regard to the NSSAI and proposes solutions for the corresponding issues.

1) Issue #1: Requested NSSAI
Requested NSSAI (included in a Registration Request) may correspond to:
i) Accepted NSSAI, if the UE has stored the Accepted NSSAI for the PLMN,
ii) Configured NSSAI, if the UE has no Accepted NSSAI but has stored the Configured NSSAI,
iii) No NSSAI (Empty) (i.e., not designating NSSAI), if the UE has stored neither Configured NSSAI nor Accepted NSSAI.

If the NSSAI is a set of S(M)-NSSAIs used for the CCNF (AMF) routing, it may be unclear which S-NSSAI value should be included in the requested NSSAI. For example, even if the UE is not using part of S-NSSAI (e.g., CriC) at the moment of sending the Registration Request, it may be unclear whether it should be included in the requested NSSAI. To solve this, the following two options A and B may be proposed.

The option A) includes, in the requested NSSAI, all S-NSSAI in the Accepted NSSAI that the UE has received last time (or most recently/last). In this case, the UE does not have to consider selecting S-NSSAI, but unnecessary NSSAI may be transferred, and S-NSSAI selection by AMF/CCNF may be considered.

The option B) includes, in the requested NSSAI, specific S-NSSAI that the UE intends to use (or for the UE's service usage) after the Registration. In this case, the faster registration can be performed by the simple S-NSSAI selection due to AMF.

2) Issue #2: Not Accepted NSSAI

If the UE needs to request a specific service that is required for the UE (e.g., IoT (Internet of Things) slice for NB (narrow band)-IoT UE) at the time of registration, the UE may include the corresponding S-NSSAI in the requested NSSAI.

If the network does not permit/allow the requested (S-)NSSAI, the UE may operate in the following scenario for rejected specific service.

If the UE has to use V2X (vehicle to anything) service, but V(visited)-PLMN A does not support V2X service for inbound roamer, the PLMN A can provide the UE with basic NSSAI (e.g., MBB) instead of requested NSSAI (i.e., V2X). In this case, the UE can use the accepted service, and the accepted service may be limited to service that the UE originally intends. Alternatively, the UE may request again the V2X usage/service with another information (e.g., override). Alternatively, the UE may de-register the registration with the PLMN A and find another PLMN.

These operations correspond to UE implementation operations, and the network rejects the request from the UE if the network cannot provide the requested service for the UE (regardless of whether the corresponding requested service is required).

3) Issue #3: NSSAI and AMF Capability

The main purpose of the (requested) NSSAI in the registration request is to avoid unnecessary redirection of CCNF (AMF) and select proper CCNF (AMF).

Whether it is assumed that there is one or more CCNF (AMF) that supports every single slice type the PLMN supports should not be mandated if a need for the isolated slice is considered. Thus, if single CCNF (AMF) cannot provide the service to all S-NSSAIs in the accepted NSSAI, there may be a need of criteria for which S-NSSAI needs to be considered first.

To solve the above-described issues #2 and #3, the present disclosure proposes to indicate priority information or characteristic information about whether a S-NSSAI or a NSSAI requested by the UE is a required one or a preferred one.

In this case, with regard to the issues #2, if a service that the UE requests from the network is required, the UE may indicate S-NSSAI for the corresponding service as a "required" value. In this instance, if the corresponding requested service cannot be provided to the UE, the network may reject the UE (or the service requested by the UE). If the UE indicates its high-priority, the network may change the policy and provide the service requested by the UE.

Furthermore, with regard to the issues #3, if the UE indicates priority information or characteristic information about which S-NSSAI is "required", the network may take the corresponding information into consideration when selecting the serving AMF. The network may also take the corresponding information into consideration when changing CCNF or slice. If the "required" slice is being used, the CCNF change shall be avoided whenever possible.

That is, to summarize the above description, the present disclosure proposes as a solution a UE operation that additionally provides a network with priority information or characteristic information about whether (S-)NSSAI that the UE requests to the network is a required one or a preferred one, in order to properly provide services required for the UE and properly select a serving AMF capable of providing the required services. Various embodiments derived from the corresponding solution are described in more detail below.

In embodiments disclosed herein, the required (S-)NSSAI has a higher priority than the preferred (S-)NSSAI. The present disclosure is described focusing on embodiments that indicate whether the (S-)NSSAI is 'required' for the UE or 'preferred' by the UE as priority information or characteristic information for convenience of explanation, but is not limited thereto. It is obvious that various types (e.g., first to nth priorities) of priority information or characteristic information of the (S-)NSSAI can be indicated.

In the following description, a NSSAI is a set of S-NSSAIs including at least one S-NSSAI and may be a concept distinguished from the S-NSSAI.

As described above, the UE includes, in an Attach (or registration) request message, etc., a NSSAI value for the selection of a network slice (NS) in a procedure such as Attach (or may be referred to as 'registration'). The NSSAI may include a slice/service type (e.g., V2X, IoT, eMBB (enhanced mobile broadband), etc.) and complementing information (e.g., service provider). If the UE is in a state of not receiving valid Temp ID (e.g., Globally Unique Temporary Identifier (GUTI)), the network may determine a CCNF based on the NSSAI transmitted from the UE. More specifically, the network may first determine the CCNF to be routed based on the NSSAI in RAN and may redirect the corresponding CCNF to another CCNF.

A priority of NSSAIs that the UE currently includes in a request message upon request such as Attach (or registration) is as follows.

1) Accepted/allowed NSSAI (NSSAI that has accepted/allowed from the network)

2) Configured NSSAI

3) Configured default NSSAI

4) No NSSAI (this may be transferred to default CCNF)

That is, the UE can include, in a request message, a NSSAI corresponding to a service to be requested according to the priority 1)→4). However, the present disclosure is not limited thereto, and the priority may not be separately defined between the NSSAIs. In this case, the UE may select a NSSAI corresponding to a service requested by the UE among the NSSAIs and include the selected NSSAI in the request message.

According to a NSSAI value requested by the UE, the network may select and register a suitable CCNF (to provide a service requested by the UE). However, if service/NSSAI requested by the UE cannot be accepted/allowed by restrictions on UE's subscription or support problem of the network, etc., the network may 1) select CCNF capable of providing a service most similar to the service requested by the UE (or capable of providing the service requested by the UE as much as possible) as 'best effort', or 2) respond to a request message of the UE with an Accept Reject message, etc. so that the UE can select another network.

However, there may be a UE that requires to provide a specific service necessarily/essentially according to types of the UE (e.g., IoT sensor UE, V2X UE, etc.). In this instance, as described above, if the network operates (e.g., selection of CCNF capable of providing as many services as possible or a similar service) such that a slice that supports only some of services requested by the UE or supports another service is registered (or CCFN is selected), the UE cannot receive a required service and may not properly operate.

According to the standardization discussion, the NSSAI may include a set consisting of multiple service/slice types and/or combinations of complementing information (e.g., eMBB-SKT, eMBB-LGE, V2X-Audi). Even in this case, if the network preferentially registers the UE with CCNF capable of supporting all of services requested by the UE, but there is no CCNF capable of supporting all the services requested by the UE, the network may 1) select CCNF supporting as many services as possible, or 2) reject the UE's request. As a result, according to the above 1), there may occur a situation in which the UE does receive a required service that the UE necessarily requests.

Accordingly, to solve these problems, as described above, a solution may be proposed in which the UE directly transmits priority information of (S-)NSSAI to the network.

Invention Proposal 1. Division of Required NSSAI and Preferred NSSAI

A UE may select a particular slice upon initial Attach (or registration) request or through a process such as a PDU session request and transmit NSSAI or SM-NSSAI corresponding to (or including) the selected slice to the network. In this instance, the UE may indicate/specify priority information about whether the corresponding NSSAI is required NSSAI that is necessarily required for the UE or preferred NSSAI that is simply preferred by the UE. The priority information can be implemented in the form of priorities through flag/bit in the corresponding NSSAI or another information element/field outside the corresponding NSSAI.

For example, an IoT sensor UE for a specific measurement enterprise (e.g., Company A) is valid for only a slice supporting combinations of slice/service type: IoT, complementing information: and Company A, and cannot operate normally in other slices. Thus, the UE can transmit priority information (e.g., indication of "required NSSAI") representing that the corresponding NSSAI is required for the UE, while transmitting NSSAI indicating the corresponding slice/service type and the complementing information via a request message.

The network may check whether NSSAI requested from the UE is valid for the corresponding UE or is able to provide services, and then select CCNF suitable to serve the corresponding UE. In this instance, the network can preferentially select CCNF that can support all of services/slices included in a NSSAI requested by the UE. However, if there is no CCNF or slice that can provide/support all the services included in the NSSAI requested by the UE, or if slice/service cannot be provided to the corresponding UE even if the CCNF or the slice exists, the network may operate based on priority information provided by the UE as follows.

1) If Requested NSSAI is (Unavailable for Service) Preferred NSSAI

The network can recognize that requested NSSAI is not required for the UE, select/determine CCNF/slice providing slice/service most similar to a NSSAI requested by the UE, CCNF/slice providing as many services/slices as possible among NSSAIs requested by the UE, or previously configured default CCNF/slice, and allow the corresponding CCNF/slice to provide services to the UE.

2) If Requested NSSAI is (Unavailable for Service) Required NSSAI

The network can recognize that requested NSSAI is required for the UE and send an Accept Reject message or a PDU session establishment reject message to the UE. In this instance, the network may include in the reject message a cause value representing that it cannot support the required slice/service/NSSAI of the UE and rejects it.

For example, the cause value may be defined/expressed as follows.

XX. Requested NSSAI cannot be accepted, or

YY. Requested NSSAI is not supported/#ZZ. Requested NSSAI is not allowed.

As described above, the cause value may be defined by one cause that NSSAI cannot be accepted (#XX), or may be defined to be subdivided into a cause of Not Support (i.e., refers to service not supported by the corresponding network) (#YY) and a cause of Not Accept (i.e., refers to service not accepted to the corresponding UE) (#ZZ).

The UE may operate according to the cause value received from the network as follows.

1. If a reject cause is a network problem, the UE may register a PLMN, that has currently attempted Attach/Registration, in a forbidden PLMN list or a blacklist with a function similar to it and perform again a PLMN selection process. In the re-preformed PLMN selection process, the PLMN included in the above list may be excluded from selection candidates of the UE.

2. If a reject cause is an Allow problem of the UE not a network problem:

A. The UE may denote a priority information of rejected NSSAI as 'preferred' and request again it to the network. In this case, the UE may not receive critical services, but can maintain minimal basic connectivity.

B. If a type of the UE is configured as a high priority, etc., the UE may specify its own priority and request again services/slices/NSSAI, that has been rejected, to the network. In this instance, the UE may denote priority information for the corresponding services/slices/NSSAI as 'required' and request it.

C. If a type of the UE is configured as a low priority, etc. and hence services/slices/NSSAI requested by the UE is rejected, the UE may override the priority to a high priority, etc.

3. If the network receives additional information described in the 2-A/B/C together with the UE's re-request (such as Attach/Registration), the network can allow/accept services/slices/NSSAI requested by the UE. In principle, the Allow/Accept of services/slices/NSSAI can be determined by policies of the network operator or network slice selection policies, etc. The network may change service policies for the UE or update UE's subscription according to a result of the Allow/Accept for the above-described re-request of the UE.

If the NSSAI consists of combinations of a plurality of individual NSSAIs or S-NSSAIs, the following embodiments may be additionally proposed.

In one embodiment, a UE may inform a network about whether all of individual NSSAIs or S-NSSAIs included in NSSAI have to be (necessarily) supported. In this case, the following two cases may exist.

1) The UE may denote that all of S-NSSAIs included in NSSAI should be necessarily allowed/accepted. For example, the UE may denote whether all the S-NSSAIs are allowed/accepted (in the form of flag) on a header of the NSSAI or another information element (IE)/field of a message including the NSSAI. In this instance, whether all the S-NSSAIs are allowed/accepted may be indicated in the form of 'all required' or 'not'. If they are indicated as 'all required', the network should search CCNF supporting all of S-NSSAIs included in the requested NSSAI and may reject a request of the UE if there is no corresponding CCNF. Detailed description of a reject operation and a subsequent operation of the network is with regard to '2) If requested NSSAI is (unavailable for service) required NSSAI' described above.

2) If all the S-NSSAIs do not have to be necessarily allowed/accepted, in the 1), the network may replace 'all required' by 'all preferred' and may indicate whether all the S-NSSAIs are necessarily allowed/accepted. In this case, the network can select CCNF, that is able to provide/support best services or as many services as possible (among requested services) in consideration of the requested NSSAI, as the best effort.

3) If only some S-NSSAIs of the NSSAI correspond to 'required' and remaining S-NSSAIs do not correspond to 'required', the UE may denote a priority information (required/preferred information) proposed above per each S-NSSAI. The following corresponds to an example of this.

a) NSSAI requested by UE1 (SKT user, optionally using LGE VPN (virtual private network) and Audi V2X)
   eMBB—SKT (Required)
   eMBB—LGE (Preferred)
   V2X—Audi (Preferred)

b) NSSAI requested by UE2 (V2X UE for Kia, optionally using KT eMBB)
   V2X—Kia (Required)
   eMBB—KT (Preferred)

If there is no CCNF that is able to support all the S-NSSAIs, the network receiving the priority information per each S-NSSAI as described above may preferentially select CCNF that is able to support required S-NSSAIs. If there is no CCNF that is able to support all the required S-NSSAIs, the network should reject a request of the UE, and detailed description of a reject operation and a subsequent operation of the network is with regard to '2) If requested NSSAI is (unavailable for service) required NSSAI' described above.

Invention Proposal 2. UE Based Slice Preference Management

In another embodiment, the UE may request a slice according to an existing method instead of defining a separate parameter to indicate the parameter to the network. In this instance, if the network accepts/allows another slice/NSSAI not slice/(S-)NSSAI requested by the UE as described above in the problem, the UE may determine whether to use corresponding service through an internal operation. If the network has not allowed/accepted slice/service/(S-) NSSAI that the UE has first requested (i.e., in a registration procedure), the UE may change its own priority or apply new configuration similarly to the UE's operation described in the above Invention Proposal 1 to request again corresponding slice/service/(S-)NSSAI to the network. This may be requested through a PDU session establishment procedure (e.g., PDU session establishment request message) irrespective of the CCNF (or AMF) determined in the first registration.

Alternatively, the UE may request de-registration/detach to select a network that is able to provide services requested by the UE. In this instance, the UE may inform the network of information such as de-registration/detach cause. After the de-registration/detach, the UE may register de-registered/detached PLMN in a forbidden PLMN list or a blacklist with a function similar to it and perform again a PLMN selection process. In the re-preformed PLMN selection process, the PLMN included in the above list may be excluded from selection candidates of the UE.

Invention Proposal 3. Decide Whether to Retain Upon Additional Slice Request

A UE or a specific application on the UE may require a slice, which does not currently receive services, in a situation in which the UE receives services via a particular slice. In this instance, the UE may request a service with this additional slice. This may be implemented by a PDU session establishment procedure, etc. requesting S-NSSAI of the corresponding slice. In this instance, if a serving CCNF or an AMF cannot currently support slice/service that the UE requests newly, the network may need to change the serving CCNF of the UE for the newly requested slice/service. However, if the network immediately changes the serving CCNF, a slice that is being serviced via the current serving CCNF/AMF is interrupted. Thus, a priority decision criteria needs to be established for the network to decide which of service that is currently being provided and service that is newly requested by the UE will be prioritized.

Upon additional/new slice request, the UE may denote (S-)NSSAI for the corresponding slice and a priority information (required/preferred) or a priority for the corresponding (S-) NSSAI as described in Invention Proposal 1. Further, the network may store a priority information (required/preferred) or a priority for service/slice that is provided to the UE. The priority information (required/preferred) or the priority may be determined by information (Invention Proposal 1) or network policies that the UE transfers to the network upon first request of the slice.

If the network receives an additional slice request, the network decides whether one AMF/CCNF (e.g., serving AMF/CCNF) can support all of slices (i.e., currently provided service/slice and newly requested service/slice). If one AMF/CCNF (e.g., serving AMF/CCNF) cannot support all the slices, the network may decide which slice will be preferentially serviced based on priority information or a priority between the slices.

According to the above decision procedure, the network:

1. may reject an additional service/slice request (or PDU session request) of the UE. In this instance, the network may inform of a detailed cause value specifying a reject cause.

2. may release/de-register a session or registration for services that is currently being provided for new service/slice request. In this instance, the network may inform of a detailed cause value specifying a release cause.

More specifically, if a priority of the currently provided slice/service is higher than a priority of the newly requested slice/service, and the serving CCNF/AMF does not support the newly requested slice/service, the network may reject the additional slice/service request of the UE. On the contrary, if a priority of the currently provided slice/service is lower than a priority of the newly requested slice/service, and the serving CCNF/AMF does not support the newly requested slice/service, the network may release/de-register the current session or registration for providing the additional slice/service the UE.

Figure 16:
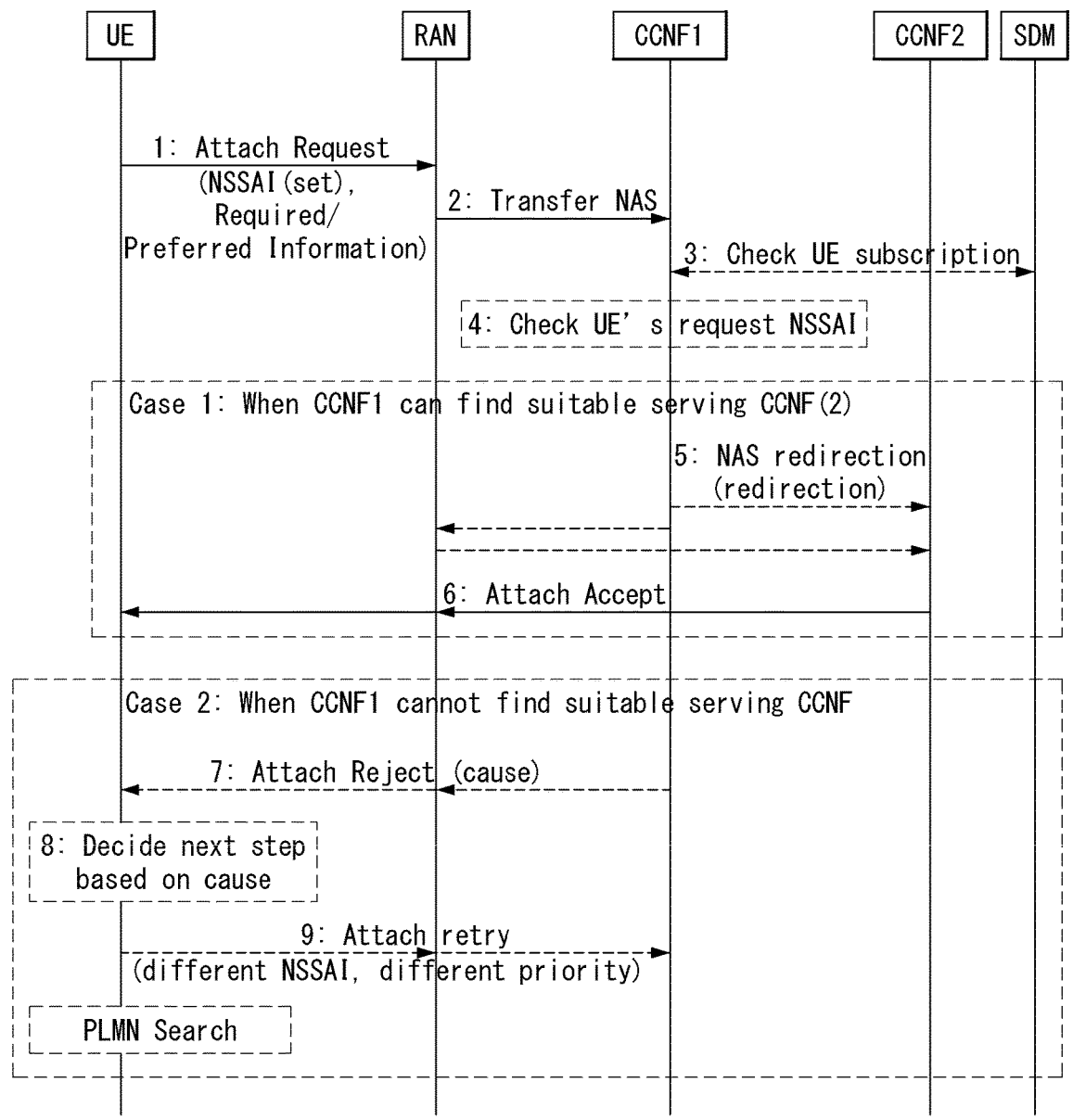
FIG. 16 is a flow chart illustrating a method for selecting a CCNF/AMF of a network according to an embodiment of the present invention.

FIG. 16 is a flow chart illustrating a method for selecting a CCNF/AMF of a network according to an embodiment of the present invention. The flow chart corresponds to a flow chart that implements more concretely the Invention Proposal 1 described above. Thus, the above descriptions/embodiments regarding the Invention Proposal 1 may be applied equally/similarly to the flow chart, and duplicate description is omitted.

1. A UE can perform an Attach (or registration) request by including, in an Attach request message (or a registration request message), both a NSSAI that is a description for services the UE wants to receive, and a priority information about whether the corresponding NSSAI is required or preferred and transmitting them to a network. In this instance, the NSSAI may include at least one S-NSSAI, and one NSSAI or a plurality of NSSAIs may be transmitted. The priority information may indicate whether each of the NSSAI or the S-NSSAI is required or preferred. A transmit/receive end of the UE creates the Attach request message (or the registration request message) in the NAS layer and sends it to the network (particularly, RAN).

2. The RAN may receive a request of the UE via the transmit/receive end, and a processor of the RAN may send the request message (including the NSSAI and the priority information) of the UE to CCNF1 or default CCNF. More specifically, if the RAN receives Temp ID or GUTI in a previous Attach (registration) procedure, the RAN sends the request message of the UE to the CCNF1 corresponding to an ID of the CCNF included in the corresponding Temp ID or GUTI. Otherwise, the RAN sends the request message of the UE to the default CCNF. In this instance, the RAN may send the request message of the UE to the CCNF1 or the default CCNF via NG2 interface.

The following is described on the assumption that the RAN sends the request message of the UE to the CCNF1 for convenience of explanation, but it is obvious that the following embodiments may be extended to an embodiment in which the CCNF1 is replaced by the default CCNF.

3. The CCNF1 receives the request message via the NG2 interface and then decodes it. A processor of the CCNF1 decides whether the NSSAI requested by the UE is valid for the corresponding UE based on a subscription, etc. of the UE via an interface with a subscriber data management (SDM) (corresponding to the above-described UDM).

4. The processor of the CCNF1 may check whether a CCNF capable of supporting the NSSAI (all of services/slices included in the NSSAI) requested by the UE exists in a current network. In this instance, the CCNF1 may receive, from the SDM, information about NSSAI (or S-NSSAI) subscribed/allowed on a subscription of the current corresponding UE or check information about NSSAI (or S-NSSAI) subscribed/allowed for the corresponding UE stored on an internal function, i.e., a UE context, and compare it with NSSAI (or S-NSSAI) requested by the UE, in order to check whether the CCNF1 itself is a CCNF capable of supporting the NSSAI (or S-NSSAI) requested by the UE.

<case 1> Case where the CCNF1 finds a suitable CCNF (i.e., CCNF supporting all of services/slices requested by the UE):

5. If CCNF2 capable of supporting the NSSAI requested by the UE exists in the network, the CCNF1 may redirect the received Attach/registration request message of the UE to the CCNF2. This may be performed via a direct interface between the CCNFs and may be performed in the form of redirection via the RAN.

6. The CCNF2 may perform/complete the registration with the corresponding UE and then send the Attach/Registration Accept message to the UE. The corresponding message is sent to the RAN via the NG2 interface of the CCNF2 and is received to the transmit/receive end of the UE via a radio transmit/receive end of the RAN.

<case 2> Case where the CCNF1 does not find a suitable CCNF (i.e., CCNF supporting all of services/slices requested by the UE):

7. If the CCNF1 cannot find a CCNF supporting the NSSAI requested by the UE or there is no CCNF, the CCNF 1 may operate based on priority information (required/preferred) provided by the UE. To this end, the AMF in the CCNF 1 may transmit a Query to a network slice selection function (NSSF) or a network repository function (NRF), etc.

In particular, the CCNF1 can preferentially find a CCNF capable of supporting a NSSAI, of which priority information is denoted as 'required', among the NSSAIs requested by the UE. If priority information is denoted/indicated for each S-NSSAI in the NSSAI, the CCNF1 can find a CCNF supporting S-NSSAI, of which priority information is denoted as 'required'. If the CCNF1 finds the CCNF supporting the 'required' NSSAI or S-NSSAI, the CCNF1 may perform the step described in the above case 1 and perform/complete a registration/Attach procedure of the UE for the corresponding CCNF.

On the contrary, if priority information of a NSSAI or S-NSSAI requested by the UE is denoted/indicated as 'preferred', the CCNF1 may find an optimal CCNF that provides slice/service similar to slice/service requested by the UE or provides the requested slice/service as many as possible as the best effort, and perform/complete an Attach/registration procedure of the UE for the corresponding CCNF in as the above case 1.

If the CCNF1 cannot find the CCNF supporting the NSSAI or the S-NSSAI denoted as 'required' or the optimal CCNF, the CCNF1 may send to the UE a registration/Attach reject message (as a response to a registration/Attach request message). Alternatively, if the NSSAI requested by the UE is not allowed for the corresponding UE, the CCNF1 may send the registration/Attach reject message to the UE. In this instance, the processor of the CCNF1 may specify a reject cause in a reject message. The reject message (or NAS message) is sent to the RAN via the NG2 interface of the CCNF2 and is received to the transmit/receive end of the UE via the radio transmit/receive end of the RAN.

8. The NAS layer of the UE may determine the following operation based on the received registration/Attach reject message (particularly, a reject cause included in the reject message).

9. If the reject cause is an allow problem of the UE (e.g., a priority or a subscription of the UE), the UE may request again Attach/registration to the network with another priority (e.g., a high priority) or another NSSAI.

If the reject cause is a network problem (e.g., if the network does not provide service of the NSSAI requested by the UE), the UE may enter a PLMN search state and find another PLMN. Alternatively, in case of the rejection for the reason of the NSSAI, the UE may basically perform a PLMN reselection operation.

The detailed description regarding the present embodiment is with regard to '2) If requested NSSAI is (unavailable for service) required NSSAI' described above.

The present invention generates an effect capable of improving efficiently/stably quality of experience (QoE) of a user by selecting a network (e.g., CCNF/AMF) supporting a service type requested by a UE or selecting a network (e.g., CCNF/AMF) capable of providing better services to the UE when using network slicing in a next generation core network.

In the implementation of FIG. 16, an operation of searching/selecting the target CCNF/AMF (i.e., CCNF2) together with the CCNF1 may be performed through an internal operation of the CCNF1 as described above, and/or may be performed by querying, by the CCNF1, to an external function (function, e.g., NSSF or NRF that is separately defined to the outside for the selection of the CCNF).

In the present specification, the CCNF may be defined as an independent, separate function, or defined as a set of multiple functions (e.g., AMF, NRF, etc.) shared between multiple slices. The CCNF may be substantially corresponded/substituted with AMF (or identified with AMF), and eventually a selection/redirection operation of the CCNF may correspond to a selection/redirection operation of the AMF.

Figure 17:
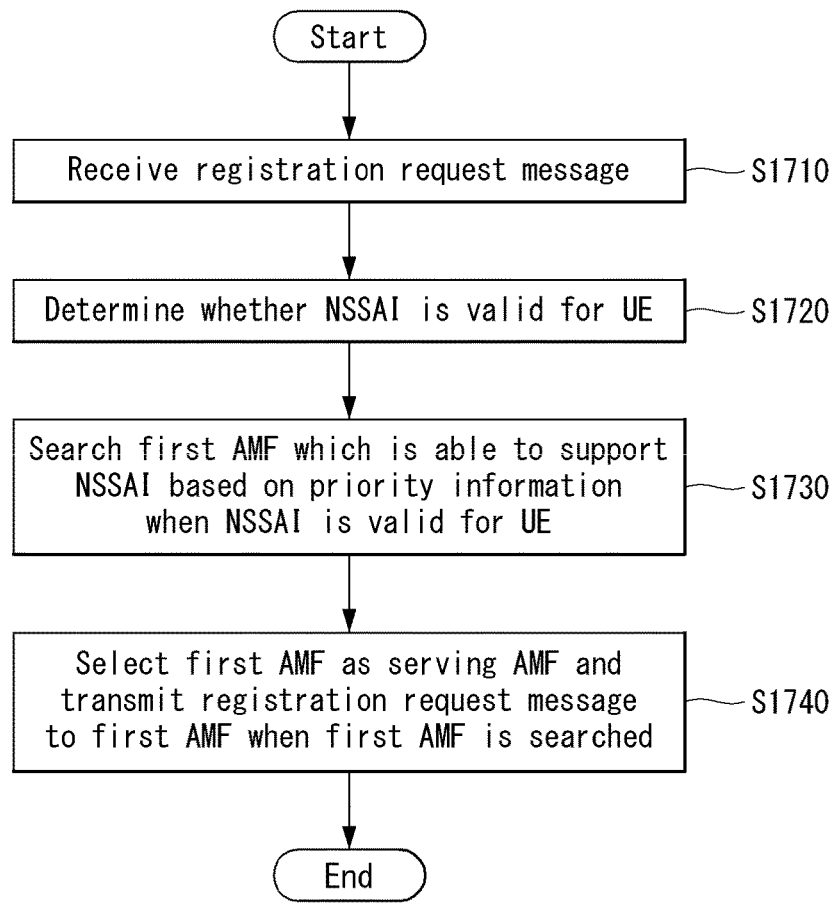
FIG. 17 is a flow chart illustrating a method for selecting a CCNF/AMF of a RAN according to an embodiment of the present invention.

FIG. 17 is a flow chart illustrating a method for selecting a CCNF/AMF of a RAN according to an embodiment of the present invention. All the above embodiments/descriptions may be applied with regard to this flow chart, and duplicate description is omitted. In this flow chart, a network node is an AMF identified by an AMF ID included in a temporary ID (e.g., GUTI or Temp ID) received through a previous registration procedure or a predetermined default AMF.

First, the network node may receive a registration request message of a UE in S1710. The registration request message may include a NSSAI for a slice/service requested by the UE and a priority information of the NSSAI. The priority information may indicate whether the NSSAI or at least one S-NSSAI included in the NSSAI is 'required' for the UE and/or whether the NSSAI or the at least one S-NSSAI is 'preferred' by the UE. However, the present invention is not limited thereto, and the priority information may be indicated/represented as various information capable of distinguishing between priorities of NSSAIs. If the NSSAI includes a plurality of S-NSSAIs and indicates a plurality of slices/services, the priority information may be indicated for each S-NSSAI. That is, the priority information may be indicated for each NSSAI or each S-NSSAI included in the NSSAI in accordance with the embodiment.

Next, the network node may determine whether the received NSSAI is valid for the UE in S1720. In this case, the network node may determine whether the slice/service indicated by the NSSAI is valid for the UE based on a subscription of the UE.

Next, if the NSSAI is valid for the UE as a result of determination, the network node may search a first AMF which is able to support the NSSAI based on the priority information in S1730. Herein, the first AMF which is able to support the NSSAI may correspond to an AMF that supports all slices/services corresponding to the NSSAI or the S-NSSAI indicating that the priority information is the 'required'.

Next, if the first AMF is searched, the network node may select the first AMF as the serving AMF serving the UE and transmit/send the registration request message to the first AMF in S1740. Since 'selecting the first AMF' as described above refers to selecting the first AMF providing a particular slice/service according to the priority information, it may be interpreted as 'selecting the particular slice/service'.

If the first AMF is not searched, the following embodiments may be applied.

In one embodiment, if the first AMF is not searched or the NSSAI is not valid for the UE, the network node may transmit to the UE a registration reject message as a response to the registration request message of the UE. In this instance, the registration reject message may include a registration reject cause. If the registration reject cause received by the UE indicates that the first AMF is not searched, the UE may perform a PLMN reselection operation. Or, if the registration reject cause received by the UE indicates that the NSSAI requested by the UE is not valid for the UE, the UE may update the priority information of the NSSAI or the S-NSSAI in the registration request message to the 'preferred' and retransmit the registration request message to the network node. This may be performed if the UE wants to keep even basic connectivity.

In another embodiment, if the first AMF is not searched, the network node may select a second AMF, that supports S-NSSAI (or service/slice corresponding to the S-NSSAI) included in the NSSAI as many as possible (or supports similar service/slice) as the best effort, as the serving AMF and transmit the registration request message to the second AMF.

Although not shown in the flow chart of FIG. 17, the network node may receive, from the UE, an additional NSSAI and a priority information of the additional NSSAI via a PDU session establishment request message.

In this instance, if a priority of the additional NSSAI is higher than a priority of the NSSAI received via the registration request message (e.g., if priority information of the additional NSSAI is indicated as 'required', and the NSSAI of the registration request message is indicated as 'preferred'), the network node may determine whether the first AMF is able to support the additional NSSAI. If the first AMF is unable to support the additional NSSAI, the network node may transmit to the UE a reject message for the PDU session establishment request message.

On the contrary, if a priority of the additional NSSAI is lower than a priority of the NSSAI received via the registration request message (e.g., if priority information of the additional NSSAI is indicated as 'preferred', and the NSSAI of the registration request message is indicated as 'required'), the network node may maintain the first AMF as the serving AMF.

Overview of Device to which the Present Invention is Applicable

Figure 18:
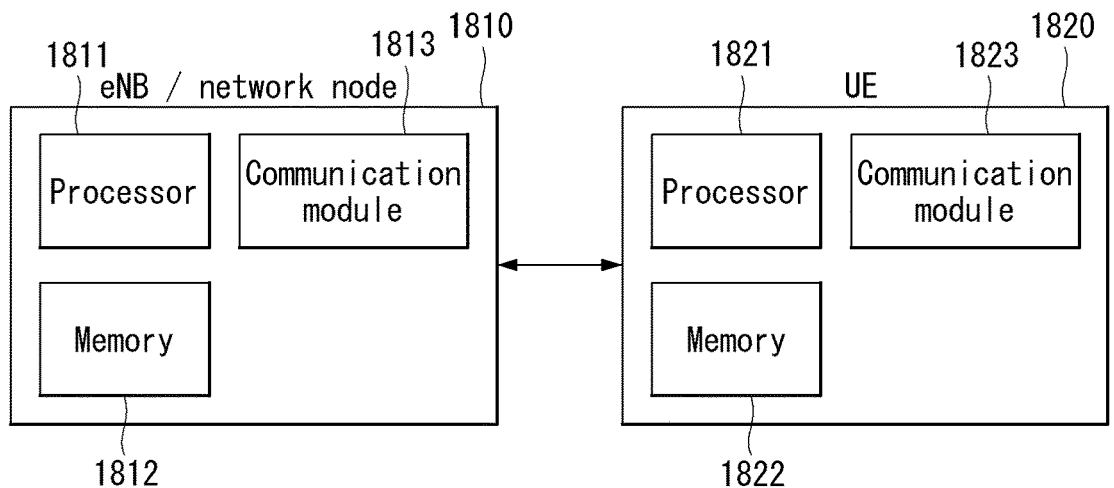
FIG. 18 illustrates a block configuration diagram of a communication device according to an embodiment of the present invention.

FIG. 18 illustrates a block configuration diagram of a communication device according to an embodiment of the present invention.

Referring to FIG. 18, a wireless communication system includes a network node 1810 and a plurality of UEs 1820. The device illustrated in this figure may be implemented to perform at least one of the aforementioned network/UE functions and may be implemented to combine and perform one or more functions.

The network node 1810 includes a processor 1811, a memory 1812, and a communication module 1813.

The processor 1811 implements at least one function, process, method proposed in FIGS. 1 to 17 and/or functions, processes, and/or methods proposed in the present disclosure. Furthermore, a module, program, etc. that implement functions, processes, and/or methods proposed in the present disclosure may be stored in the memory 1812 and executed by the processor 1811.

Layers of wired/wireless interface protocol may be implemented by the processor 1811. Furthermore, the processor 1811 may be implemented to independently apply various embodiments proposed in the present disclosure or simultaneously apply two or more embodiments of the present disclosure.

The memory 1812 is connected to the processor 1811 and stores various types of information for driving the processor 1811. The memory 1812 may be inside or outside the processor 1811 and may be connected to the processor 1811 through various well-known means.

The communication module 1813 is connected to the processor 1811 and transmits and/or receives wired/wireless signals. Examples of the network node 1810 may include a base station, MME, HSS, SGW, PGW, SCEF, SCS/AS, AUSF, AMF, PCF, SMF, UDM, UPF, AF, (R)AN, UE, NEF, NRF, UDSF and/or SDSF. In particular, if the network node 1810 is the base station (or if it is implemented to perform an (R)AN function), the communication module 1813 may include a radio frequency (RF) unit for transmitting/receiving a radio signal. In this case, the network node 1810 may have a single antenna or multiple antennas.

The UE 1820 includes a processor 1821, a memory 1822, and a communication module (or RF unit) 1823. The processor 1821 implements at least one function, process, method proposed in FIGS. 1 to 17 and/or functions, processes, and/or methods proposed in the present disclosure. Furthermore, a module, program, etc. that implement functions, processes, and/or methods proposed in the present disclosure may be stored in the memory 1822 and executed by the processor 1821.

Layers of wired/wireless interface protocol may be implemented by the processor 1821. Furthermore, the processor 1821 may be implemented to independently apply various embodiments proposed in the present disclosure or simultaneously apply two or more embodiments of the present disclosure.

The memory 1822 is connected to the processor 1821 and stores various types of information for driving the processor 1811. The memory 1822 may be inside or outside the processor 1821 and may be connected to the processor 1821 through various well-known means. The communication module 1823 is connected to the processor 1821 and transmits and/or receives wired/wireless signals.

The memories 1812 and 1822 may be inside or outside the processors 1811 and 1821 and may be connected to the processors 1811 and 1821 through various well-known means. Further, the network node 1810 (in case of the base station) and/or the UE 1820 may have a single antenna or multiple antennas.

Figure 19:
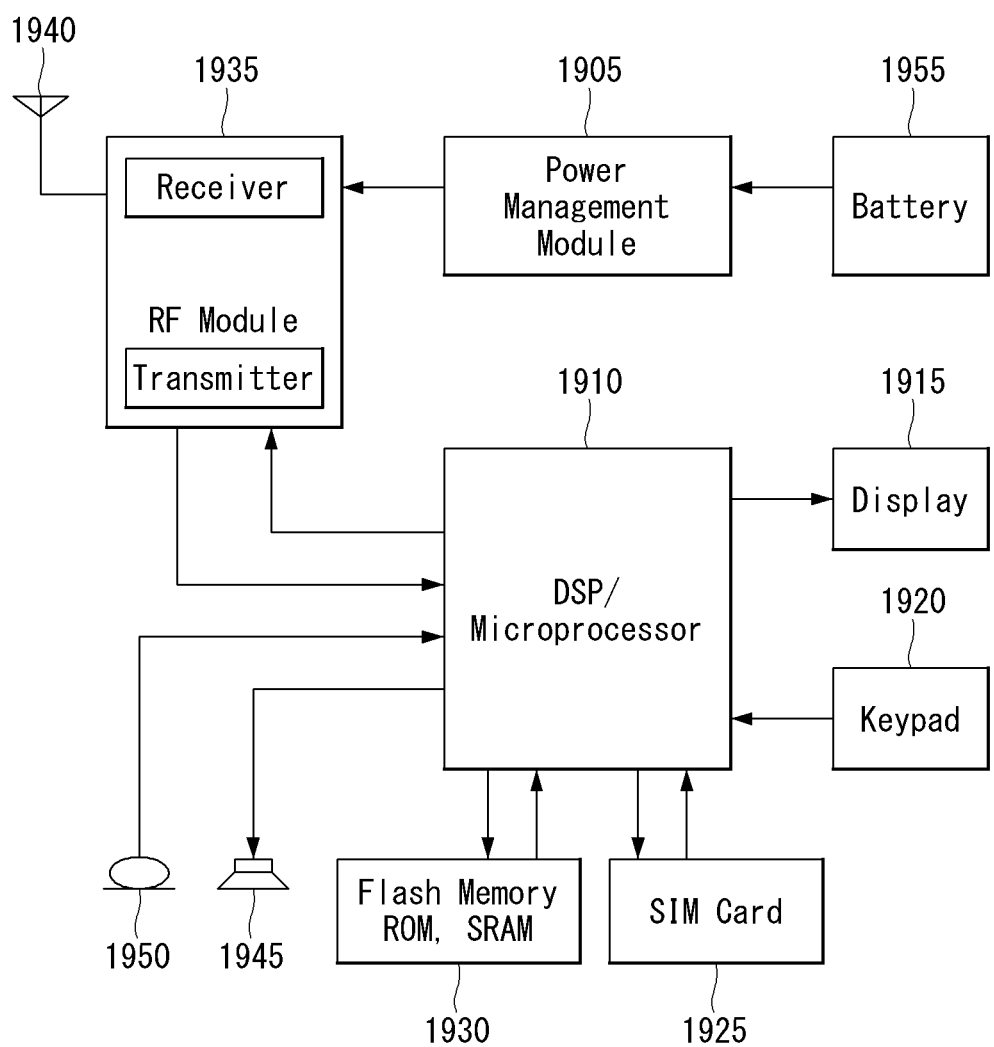
FIG. 19 illustrates a block configuration diagram of a communication device according to an embodiment of the present invention.

FIG. 19 illustrates a block configuration diagram of a communication device according to an embodiment of the present invention.

In particular, FIG. 19 illustrates the UE illustrated in FIG. 18 in more detail.

Referring to FIG. 19, the UE may include a processor (or digital signal processor (DSP)) 1910, an RF module (or RF unit) 1935, a power management module 1905, an antenna 1940, a battery 1955, a display 1915, a keypad 1920, a memory 1930, a subscriber identification module (SIM) card 1925 (which is optional), a speaker 1945, and a microphone 1950. The UE may also include a single antenna or multiple antennas.

The processor 1910 implements functions, processes, and/or methods proposed in FIGS. 1 to 18. Layers of a radio interface protocol may be implemented by the processor 1910.

The memory 1930 is connected to the processor 1910 and stores information related to operations of the processor 1910. The memory 1930 may be inside or outside the processor 1910 and may be connected to the processors 1910 through various well-known means.

A user inputs instructional information, such as a telephone number, for example, by pushing (or touching) buttons of the keypad 1920 or by voice activation using the microphone 1950. The processor 1910 receives and processes the instructional information to perform an appropriate function, such as to dial the telephone number. Operational data may be extracted from the SIM card 1925 or the memory 1930. Further, the processor 1910 may display instructional information or operational information on the display 1915 for the user's reference and convenience.

The RF module 1935 is connected to the processor 1910 and transmits and/or receives an RF signal. The processor 1910 delivers instructional information to the RF module 1935 in order to initiate communication, for example, transmit radio signals configuring voice communication data. The RF module 1935 consists of a receiver and a transmitter to receive and transmit radio signals. The antenna 1940 functions to transmit and receive radio signals.

Upon reception of the radio signals, the RF module 1935 may transfer signals for processing by the processor 1910 and convert the signal into a baseband. The processed signal may be converted into audible or readable information output via the speaker 1945.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The present invention has been described based on an example in which it has been applied to the 3GPP LTE/LTE-A/5G (NextGen) systems, but may be applied to various wireless communication systems in addition to the 3GPP LTE/LTE-A/5G (NextGen) systems.

The invention claimed is:

1. A method for selecting a serving Access and Mobility Management Function (AMF) of a network node in a wireless communication system, the method comprising:

receiving a registration request message of a user equipment (UE), the registration request message including ci) a network slice selection assistance information (NSSAI) for a slice requested by the UE and (ii) priority information of the NSSAI, wherein the priority information indicates at least one of (i) whether the NSSAI or at least one S(single)-NSSAI included in the NSSAI is 'required' for the UE or (ii) whether the NSSAI or the at least one S-NSSAI is 'preferred' by the UE;

determining whether the NSSAI is valid for the UE;

based on the NSSAI being valid for the UE and based on the priority information: searching a first AMF which is able to support the NSSAI;

based on the first AMF being not searched or the NSSAI being not valid for the UE:

transmitting to the UE a registration reject message as a response to the registration request message, wherein the registration reject message includes a registration reject cause; and based on the registration reject cause indicating that the NSSAI is not valid for the UE: receiving, from the UE, a retransmission of the registration request message, wherein the priority information of the NSSAI or the at least one S-NSSAI in the registration request message is updated to the 'preferred' by the UE.

2. The method of claim 1, further comprising, based on the first AMF being searched:
  selecting the first AMF as the serving AMF serving the UE; and
  transmitting the registration request message to the first AMF.

3. The method of claim 2, wherein the first AMF which is able to support the NSSAI is an AMF that supports all slices corresponding to the NSSAI or the at least one S-NSSAI indicating that the priority information is the 'required'.

4. The method of claim 3, wherein determining whether the slice is valid for the UE comprises determining whether the slice is valid for the UE based on a subscription of the UE.

5. The method of claim 3, wherein based on the registration reject cause indicating that the first AMF is not searched: the UE performs a public land mobile network (PLMN) reselection operation.

6. The method of claim 3, further comprising, based on the first AMF not being searched:
  selecting a second AMF, that supports S-NSSAI included in the NSSAI at most, as the serving AMF; and
  transmitting the registration request message to the second AMF.

7. The method of claim 3, further comprising receiving, from the UE, an additional NSSAI and priority information of the additional NSSAI via a protocol data unit (PDU) session establishment request message.

8. The method of claim 7, further comprising, based on a priority of the additional NSSAI being higher than a priority of the NSSAI received via the registration request message: determining whether the first AMF is able to support the additional NSSAI.

9. The method of claim 8, further comprising, based on the first AMF being unable to support the additional NSSAI: transmitting to the UE a reject message for the PDU session establishment request message.

10. The method of claim 2, wherein the network node is (i) an AMF identified by an AMF ID received through a previous registration procedure or (ii) a predetermined default AMF.

11. A network node configured to select a serving Access and Mobility Management Function (AMF) in a wireless communication system, the network node comprising:
  a transceiver;
  at least one processor; and
  at least one computer memory operably connectable to the at least one processor and storing instructions that, when executed by the at least one processor, perform operations comprising:
  receiving a registration request message of a user equipment (UE), the registration request message including (i) a network slice selection assistance information (NSSAI) for a slice requested by the UE and iii) priority information of the NSSAI, wherein the priority information indicates at least one of (i) whether the NSSAI or at least one S(single)-NSSAI included in the NSSAI is 'required' for the UE or (ii) whether the NSSAI or the at least one S-NSSAI is 'preferred' by the UE;
  determining whether the NSSAI is valid for the UE;
  based on the NSSAI being valid for the UE and based on the priority information: searching a first AMF which is able to support the NSSAI; and
  based on the first AMF being not searched or the NSSAI being not valid for the UE, transmitting, to the UE a registration reject message as a response to the registration request message, wherein the registration reject message includes a registration reject cause; and
  based on the registration reject cause indicating that the NSSAI is not valid for the UE, receiving, from the UE, a retransmission of the registration request message, wherein the priority information of the NSSAI or the at least one S-NSSAI in the registration request message is updated to the 'preferred' by the UE.

12. The network node of claim 11, wherein the operations further comprise:
  based on the first AMF being searched:
    selecting the first AMF as the serving AMF serving the UE; and
    transmitting the registration request message to the first AMF.

* * * * *